United States Patent
Kondo et al.

(10) Patent No.: US 8,442,313 B2
(45) Date of Patent: May 14, 2013

(54) IMAGE POSITION RECOGNITION APPARATUS, IMAGE POSITION RECOGNITION METHOD, COMPUTER PROGRAM PRODUCT, AND APPARATUS FOR SETTING CORRECTION DATA FOR AN IMAGE DISPLAY APPARATUS

(75) Inventors: Hirotaka Kondo, Kanagawa (JP); Koji Takamiya, Kanagawa (JP)

(73) Assignee: Sony Corporation (JP)

( * ) Notice: Subject to any disclaimer, the term of this patent is extended or adjusted under 35 U.S.C. 154(b) by 855 days.

(21) Appl. No.: 12/584,250

(22) Filed: Sep. 2, 2009

(65) Prior Publication Data

US 2010/0067788 A1 Mar. 18, 2010

(30) Foreign Application Priority Data

Sep. 9, 2008 (JP) ................. P2008-231292

(51) Int. Cl.
*G06K 9/00* (2006.01)
(52) U.S. Cl.
USPC ................. 382/167; 353/69; 345/77
(58) Field of Classification Search .......... 345/76, 345/77, 173; 353/69, 70; 358/1.15; 378/22; 382/137, 154, 190, 266
See application file for complete search history.

(56) References Cited

U.S. PATENT DOCUMENTS

| | | | | |
|---|---|---|---|---|
| 7,327,886 B2 * | 2/2008 | Ito | ................. | 382/190 |
| 7,345,660 B2 * | 3/2008 | Mizukoshi et al. | ............. | 345/77 |
| 7,834,825 B2 * | 11/2010 | Mizukoshi et al. | ............. | 345/77 |
| 7,907,788 B2 * | 3/2011 | Kawabe | ......................... | 382/266 |
| 7,953,268 B2 * | 5/2011 | Nepomniachtchi | ........... | 382/137 |
| 8,022,908 B2 * | 9/2011 | Mizukoshi et al. | ............. | 345/77 |
| 8,155,433 B2 * | 4/2012 | Chien | ........................... | 382/154 |
| 8,162,487 B2 * | 4/2012 | Ofune et al. | ..................... | 353/70 |
| 2004/0061838 A1 | 4/2004 | Mochizuki et al. | | |
| 2004/0264635 A1 * | 12/2004 | Eberhard et al. | ................ | 378/22 |
| 2006/0181687 A1 * | 8/2006 | Matsuda | .......................... | 353/69 |
| 2007/0008251 A1 * | 1/2007 | Kohno et al. | ................... | 345/76 |
| 2007/0064267 A1 * | 3/2007 | Murakata et al. | ............ | 358/1.15 |
| 2009/0231287 A1 * | 9/2009 | Rogowitz et al. | ............ | 345/173 |

FOREIGN PATENT DOCUMENTS

| | | |
|---|---|---|
| JP | 2000-350230 A | 12/2000 |
| JP | 2003-009040 A | 1/2003 |
| JP | 2005-318652 A | 11/2005 |
| JP | 2006-153914 A | 6/2006 |

OTHER PUBLICATIONS

Matsui, I., "Liquid crystal projector", machine translation of Japanese application 2006-153914, Jun. 2006.*

* cited by examiner

*Primary Examiner* — Vu Le
*Assistant Examiner* — Xuemei Chen
(74) *Attorney, Agent, or Firm* — Lerner, David, Littenberg, Krumholz & Mentlik, LLP

(57) ABSTRACT

In an image position recognition apparatus, an image signal acquirer acquires, from an image capture apparatus, red, blue, and green image signals obtained by capturing the picture from an image display apparatus. A position recognition unit uses the acquired red, blue, and green image signals as a basis for recognizing the position in a captured picture corresponding to a given region among respective regions obtained by plurally dividing the picture from the image display apparatus. When the position recognition unit recognizes the position in the captured picture corresponding to the given region of the picture from the image display apparatus, a correction data setting unit sets data for emphasizing the given region as the correction data corresponding to the given region of the red, blue, and green image signals in the image display apparatus.

8 Claims, 20 Drawing Sheets

EXAMPLE FOR RECOGNIZING
IMAGE INVERSION

EXAMPLE FOR RECOGNIZING CORNER POSITIONS

EXAMPLE FOR RECOGNIZING EDGE MIDPOINTS

FIG. 8A
PRE-CONVERSION IMAGE
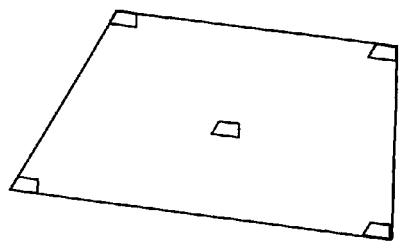
FIG. 8B
POST-CONVERSION IMAGE
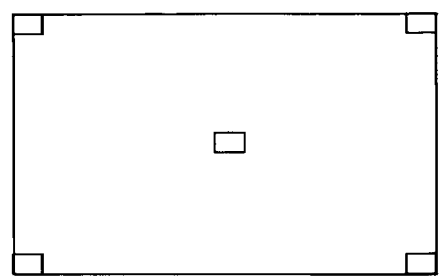
FIG. 9

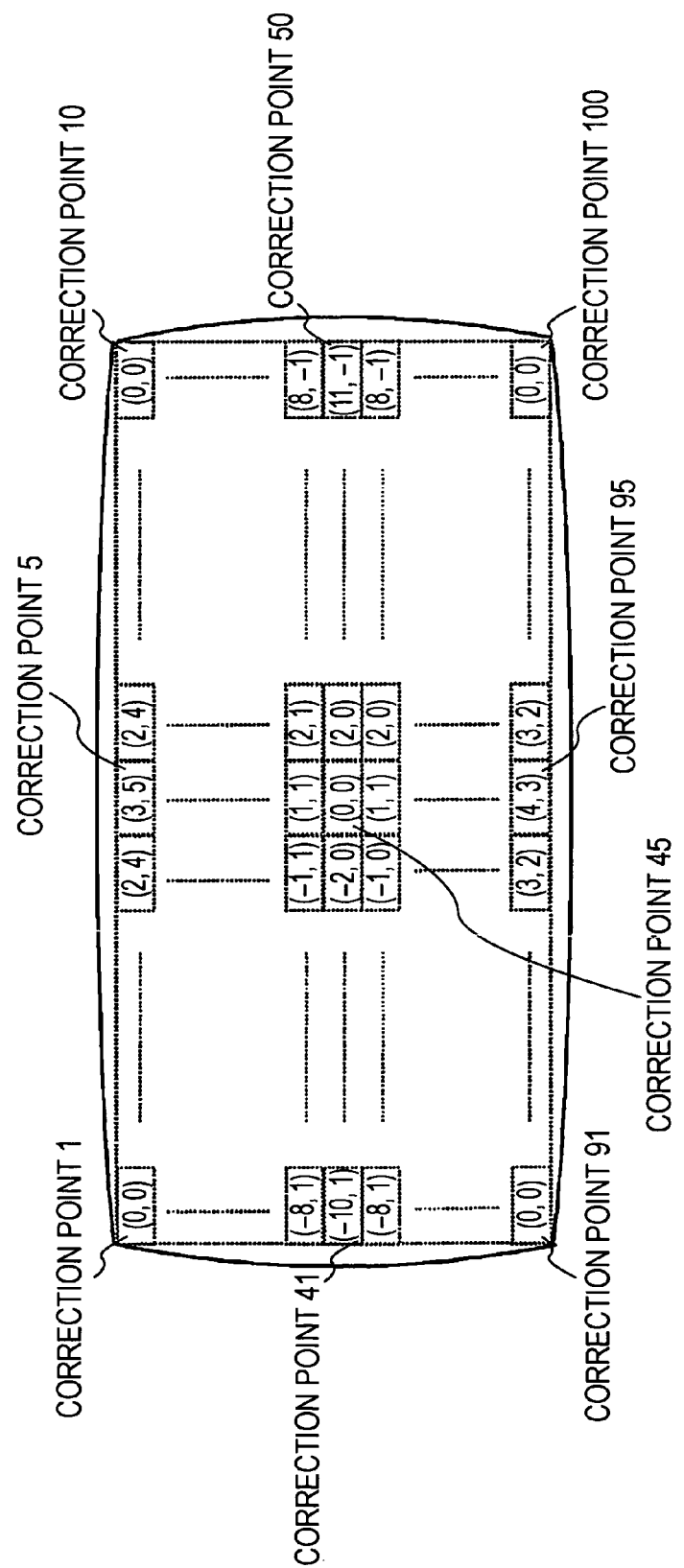

IMAGE POSITION RECOGNITION APPARATUS, IMAGE POSITION RECOGNITION METHOD, COMPUTER PROGRAM PRODUCT, AND APPARATUS FOR SETTING CORRECTION DATA FOR AN IMAGE DISPLAY APPARATUS

CROSS-REFERENCE TO RELATED APPLICATION

The present application claims priority from Japanese Patent Application No. JP 2008-231292 filed in the Japanese Patent Office on Sep. 9, 2008, the entire content of which is incorporated herein by reference.

BACKGROUND OF THE INVENTION

1. Field of the Invention

The present invention relates to an image position recognition apparatus, an image position recognition method, a computer program product, and an apparatus for setting correction data for an image display apparatus. More particularly, the present invention relates to an image position recognition apparatus and other embodiments configured to recognize the position in a captured picture corresponding to a given region of a picture from an image display apparatus, wherein the captured picture is obtained by capturing (i.e., imaging) the picture from the image display apparatus. The recognition is achieved on the basis of captured image signals wherein the given region is emphasized. Doing so enables favorable recognition of the correspondence between respective regions of the picture from the image display apparatus and positions in the captured picture.

2. Description of the Related Art

For example, in a liquid crystal projector, uneven color may occur due to the particular liquid crystal panel or the projection optics. In one proposal for correcting such uneven color, correction data for red, blue, and green image signals is set for each region (i.e., correction point) obtained by plurally dividing the picture. The signal levels of the per-color image signals are then adjusted using the set correction data.

According to the related art, correction data for each correction point in a picture can be generated by capturing the picture projected onto a screen with a camera (i.e., an image capture apparatus), and then using the captured image signals corresponding to the picture (see Japanese Unexamined Patent Application Publication No. 2006-153914, for example.)

SUMMARY OF THE INVENTION

In a camera-using system of the related art as described above, the correspondence between respective regions of the picture and positions in the captured picture is ascertained by extracting a picture capture area from the captured image. Consequently, the picture capture area of the captured image might not be correctly extracted. If the picture capture area is not correctly extracted from the captured image, then the correspondence between each region of the picture and positions in the captured picture is not correctly ascertained, and the correction data for each correction point in the picture is not correctly generated.

In addition, a camera-using system of the related art as described above assumes that the entire picture is being displayed, and is not compatible in cases where the entire picture is not being displayed. Furthermore, a camera-using system of the related art as described above is not compatible in the case where the picture display has been horizontally or vertically inverted.

It is thus desirable to enable favorable recognition of the correspondence between respective regions of a picture from a image display apparatus and positions in a captured picture.

An image position recognition apparatus in accordance with an embodiment of the present invention includes: an image signal acquirer configured to acquire, from an image capture apparatus, a red image signal, a blue image signal, and a green image signal obtained by capturing the picture from an image display apparatus; a position recognition unit configured to use the red image signal, the blue image signal, and the green image signal acquired by the image signal acquirer as a basis for recognizing the position in the captured picture corresponding to a given region among respective regions obtained by plurally dividing the picture from the image display apparatus; and a correction data setting unit configured such that, when the position recognition unit recognizes the position in the captured picture corresponding to the given region of the picture from the image display apparatus, data for emphasizing the given region is set as correction data corresponding to the given region of the red image signal, the blue image signal, and the green image signal in the image display apparatus.

In an embodiment of the present invention, an image signal acquirer is used to acquire, from an image capture apparatus, a red image signal, a blue image signal, and a green image signal obtained by capturing the picture from an image display apparatus. For example, if the image display apparatus is a liquid crystal projector, then an image capture apparatus captures the picture portion being actually displayed on a screen, and thus the entire picture might not be captured in some cases.

A position recognition unit is used to recognize the position in the captured picture corresponding to a given region among the regions obtained by plurally dividing the picture from the image display apparatus. The position recognition unit conducts recognition on the basis of the red image signal, the blue image signal, and the green image signal acquired by the image signal acquirer.

At the time of the above recognition, a correction data setting unit sets data for emphasizing the given region as the correction data corresponding to the given region of the red image signal, the blue image signal, and the green image signal in the image display apparatus. In this case, since the position in the captured picture corresponding to the given region is emphasized, the position recognition unit is easily able to recognize the position in the captured picture corresponding to the given region by searching for the emphasized position.

In this way, in an embodiment of the present invention, a position recognition processes a captured image signal and easily recognizes the position in the captured picture corresponding to a given region of a picture from an image display apparatus. Consequently, the correspondence between respective regions of the picture from the image display apparatus and positions in the captured picture can be favorably recognized.

For example, the position recognition unit may recognize positions in the captured picture corresponding to the regions among those of the picture from the image display apparatus that correspond to the four corners of the picture portion captured by the image capture apparatus. Such recognition processing may, for example, be conducted as follows.

First, the position recognition unit conducts a first process to recognize the position in the captured picture corresponding to a first region among those of the picture from the image display apparatus that corresponds to one of the four corners. If the entire picture from the image display apparatus is not being displayed during the first process, then the position in the captured picture corresponding to the first region is not recognized.

In this case, the position recognition unit conducts a second process to recognize the position in the captured picture corresponding to a region near the first region. In so doing, the position recognition unit favorably recognizes positions in the captured picture corresponding to the four corners of the picture portion captured by the image capture apparatus.

For example, the position recognition unit may recognize positions in the captured picture corresponding to regions among those of the picture from the image display apparatus that correspond to a first region located in the center and a second region shifted away from the first region in both the vertical and horizontal directions. By recognizing the first and second regions, the position recognition unit becomes able to determine whether or not the picture from the image display apparatus has been inverted horizontally or vertically. If the position recognition unit determines that the picture from the image display apparatus has been inverted, then the captured picture is converted to a normal display state, and then subjected to recognition processing in that state. By converting the captured picture to a normal display state in this way, processing can be simplified. For example, if the position in the captured picture corresponding to a region that corresponds to one of the four corners is emphasized, then the search range can be narrowed when searching for that emphasized position.

In addition to the regions corresponding to the four corners as described above, the position recognition unit may also recognize positions in the captured picture corresponding to regions among those of the picture from the image display apparatus that correspond to the midpoints of the quadrilateral edges of the picture portion captured by the image capture apparatus. For example, distortions in the lens or other elements of the image capture apparatus (i.e., the camera) might cause the top and bottom or left and right sides of the portion of the captured picture corresponding to the rectangular picture of the image display apparatus to become bowed in practice.

For this reason, if just information expressing the positions in the captured picture corresponding to regions that correspond to the four corners is used, then correspondence errors may occur when estimating positions in the captured picture corresponding to other regions of the picture from the image display apparatus. By recognizing positions in the captured picture corresponding to regions that correspond to the midpoints of the quadrilateral edges of the picture portion captured by the image capture apparatus as described above, such correspondence errors can be corrected.

An apparatus for setting correction data for an image display apparatus in accordance with another embodiment of the present invention includes: an image signal acquirer configured to acquire, from an image capture apparatus, a red image signal, a blue image signal, and a green image signal obtained by capturing the picture from an image display apparatus; a correction data setting unit configured to set correction data for the red image signal, the blue image signal, and the green image signal in the image display apparatus for respective regions obtained by plurally dividing the picture from the image display apparatus; an image recognition unit configured to recognize the correspondence between respective regions of the picture from the image display apparatus and positions in the captured picture; and a correction data computation unit configured to solve for correction data on the basis of the results of the correspondence recognition by the image recognition unit using the red image signal, the blue image signal, and the green image signal acquired by the image signal acquirer, wherein the correction data corresponds to respective regions of the picture from the image display apparatus set by the correction data setting unit. The image recognition unit recognizes positions in the captured picture corresponding to a given region among those of the picture from the image display apparatus on the basis of the red image signal, the blue image signal, and the green image signal acquired by the image signal acquirer, wherein data for emphasizing the given region has been set as correction data corresponding to the given region of the red image signal, the blue image signal, and the green image signal in the image display apparatus.

In an embodiment of the present invention, an image signal acquirer is used to acquire, from an image capture apparatus, a red image signal, a blue image signal, and a green image signal obtained by capturing the picture from an image display apparatus. For example, if the image display apparatus is a liquid crystal projector, then an image capture apparatus captures the picture portion being actually displayed on a screen, and thus the entire picture might not be captured in some cases. By means of the image recognition unit, the correspondence between respective regions of the picture from the image display apparatus and positions in the captured picture is recognized.

Subsequently, the correction data computation unit is used to solve for correction data for the per-color image signals corresponding to the respective regions of the picture from the image display apparatus. For example, the correction data may be color correction data or brightness correction data. In this case, the correction data computation unit computes correction data on the basis of the results of the correspondence recognition by the image recognition unit, using the per-color image signals acquired by the image signal acquirer. The correction data is then set in the image display apparatus by the correction data setting unit.

The image recognition unit recognizes positions in the captured picture corresponding to a given region among those of the picture from the image display apparatus on the basis of the per-color image signals, wherein data for emphasizing the given region has been set as correction data corresponding to the given region of the per-color image signals in the image display apparatus.

For this reason, the image recognition unit favorably recognizes the correspondence between respective regions of the picture from the image display apparatus and positions in the captured picture. Consequently, the correction data computation unit that computes correction data for the respective regions of the picture from the image display apparatus on the basis of the above correspondence is able to accurately solve for correction data for the respective regions, and correction data can be set enabling accurate correction of issues such as uneven color and brightness in the image display apparatus.

In an embodiment of the present invention, the image recognition unit may, for example, be configured to recognize positions in the captured picture corresponding to regions among those of the picture from the image display apparatus that correspond to the center and the four corners of the picture portion captured by the image capture apparatus. On the basis of the center and four-corner position recognition results, the image recognition unit recognizes the correspondence between respective regions in the picture from the image display apparatus and positions in the captured picture. When computing the correction data corresponding to respective regions of the picture from the image display apparatus, the correction data computation unit extracts pixel data from the per-color image signals contained in the regions of the captured picture corresponding to the respective regions estimated according to the center and four-corner position recognition results. The correction data computation unit then makes the extraction range of the pixel data from the per-color image signals corresponding to the respective regions smaller biased outward with increasing separation from the center and four-corner regions.

In this case, the extraction range of pixel data to be used is limited to each region (i.e., correction point). Consequently, even if lens or other distortions in the image capture apparatus (i.e., the camera) cause bowing of the top and bottom or left and right sides of the portion of the captured picture corresponding to the rectangular picture of the image display apparatus (i.e., the picture capture portion), the use of pixel data in adjacent regions can be suppressed when computing the correction data for each region, and the computational accuracy of the correction data corresponding to each region can be increased.

In addition, in an embodiment of the present invention, the image recognition unit may also, for example, recognize positions in the captured picture corresponding to regions among those of the picture from the image display apparatus that correspond to the center and the four corners of the picture portion captured by the image capture apparatus. On the basis of the center and four-corner position recognition results, the image recognition unit recognizes the correspondence between respective regions of the picture from the image display apparatus and positions in the captured picture. The image recognition unit additionally recognizes positions in the captured picture corresponding to regions among those of the picture from the image display apparatus that correspond to the midpoints of the quadrilateral edges of the picture portion captured by the image capture apparatus. On the basis of the recognition results for the positions of the midpoints of the quadrilateral edges by the image recognition unit, the correction data computation unit computes shift amounts for regions in the captured picture corresponding to the respective regions estimated according to the center and four-corner position recognition results. When computing correction data corresponding to the respective regions of the picture from the image display apparatus, the correction data computation unit shifts the regions in the captured picture corresponding to the respective regions estimated according to the center and four-corner position recognition results by the computed shift amounts, and uses the pixel data from the per-color image signals contained in the shifted regions.

In this case, when computing correction data corresponding to the respective regions of the picture from the image display apparatus, the respective regions estimated according to the recognition results for the positions of the center and the four corners are used after being shifted by the shift amounts from the positions of the original regions computed on the basis of the earlier recognition results for the positions of the midpoints of the quadrilateral edges. For this reason, the correction data for each region is computed using only the pixel data from the per-color image signals corresponding to the respective regions, and the computational accuracy of the correction data corresponding to each region can be increased.

According to an embodiment of the present invention, the position in a captured picture corresponding to a given region of a picture from an image display apparatus is recognized, wherein the captured picture is obtained by capturing the picture from the image display apparatus. The recognition is achieved on the basis of captured image signals wherein the given region is emphasized. As a result, the correspondence between respective regions of the picture from the image display apparatus and positions in the captured picture is favorably recognized.

BRIEF DESCRIPTION OF THE DRAWINGS

FIG. 8A illustrates an example of a pre-conversion image;

FIG. 8B illustrates an example of a post-conversion image resulting from processing R, B, and B captured images such that the shape of the picture portion from a liquid crystal projector in a captured picture matches the shape of the original picture in the liquid crystal projector;

FIG. 9 illustrates an example of respective correction points obtained by plurally dividing a picture from a liquid crystal projector;

FIG. 20B is a diagram for explaining a method for computing the shifting of estimated regions from their original regions, the estimated regions corresponding to respective correction points on a post-conversion captured picture, and estimated on the basis of recognition results for positions on a captured picture corresponding to correction points at the four corners and center.

DESCRIPTION OF THE PREFERRED EMBODIMENTS

Hereinafter, preferred embodiments of the present invention will be described.

[Exemplary Configuration of Color Correction System]

Figure 1:
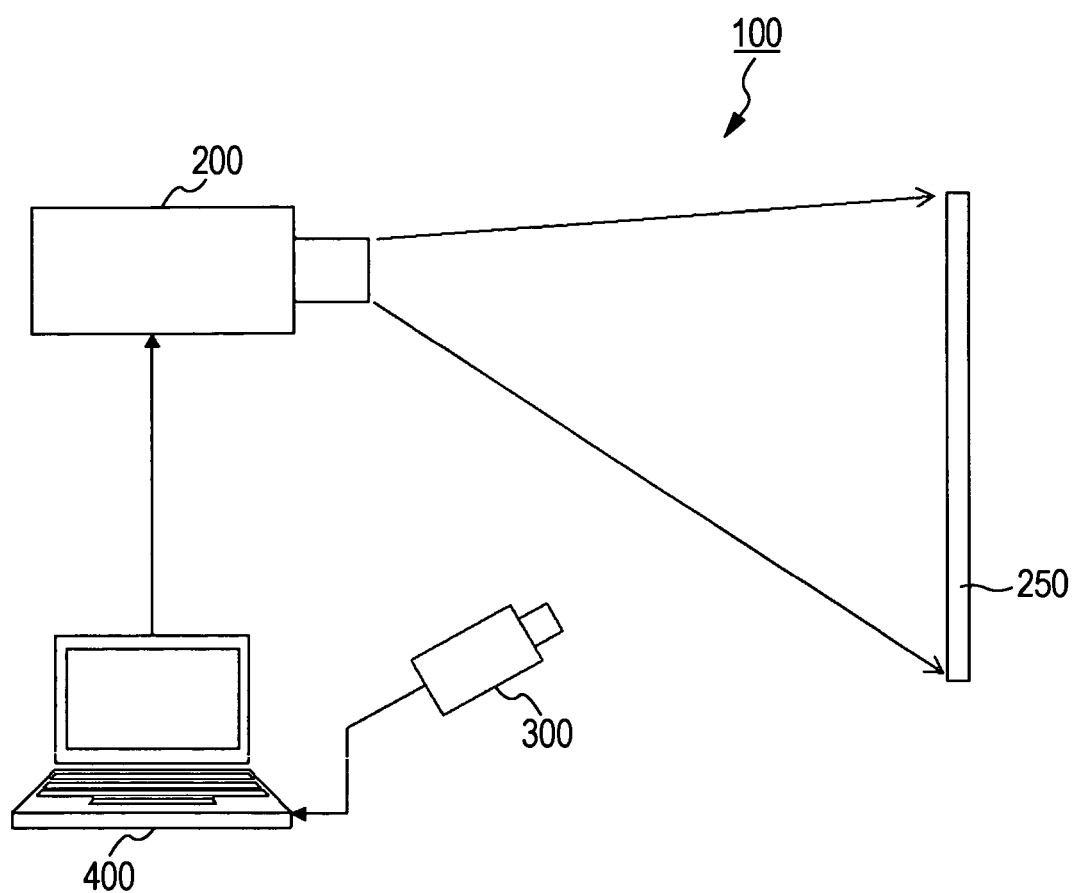
FIG. 1 illustrates an exemplary configuration of a color correction system in accordance with an embodiment of the present invention.

FIG. 1 illustrates an exemplary configuration of a color correction system 100 in accordance with an embodiment of the present invention. The color correction system 100 includes a liquid crystal projector 200 that operates as an image display apparatus, a camera 300 that operates as an image capture apparatus, and a personal computer (PC) 400 that operates as a correction data setting apparatus.

In the color correction system 100, a picture projected onto a screen 250 by the liquid crystal projector 200 is captured by the camera 300 in order to correct uneven color in the picture projected onto the screen 250. The red, green, and blue image signals obtained by the camera 300 are supplied to the PC 400. FIG. 1 illustrates a front projector by way of example, wherein the camera 300 captures the screen 250 from the left side. However, in the case of a rear projector, the camera 300 would capture the screen 250 from the right side.

In the PC 400, the captured image signals are processed, and correction data for the red, green and blue image signals in the liquid crystal projector 200 is generated for each correction point in the picture from the liquid crystal projector 200. In the present case, correction data at each correction point is generated for a scale of signal levels in the red, green, and blue image signals in the liquid crystal projector 200. The correction points herein refer to respective regions obtained by plurally dividing the picture from the liquid crystal projector 200.

The correction data generated by the PC 400 is set in a color correction circuit (not shown) of the liquid crystal projector 200. In this color correction circuit, signal level conversion processing of the red, green, and blue image signals is conducted on the basis of the set correction data. As a result of the level conversion processing, uneven color in the picture displayed on the screen 250 is corrected.

[Exemplary Configuration of Liquid Crystal Projector]

Figure 2:
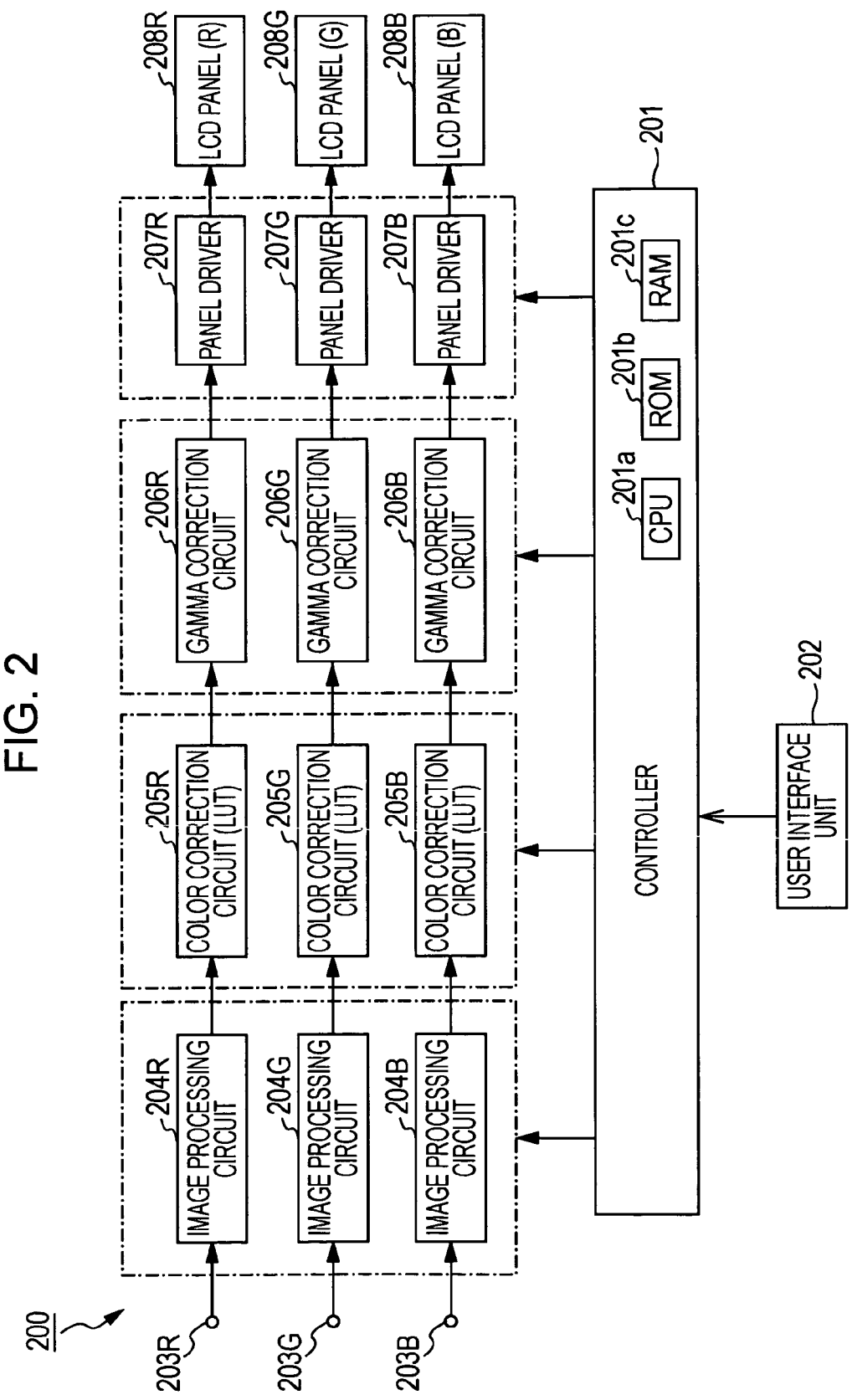
FIG. 2 is a block diagram illustrating an exemplary configuration of a circuit system in a liquid crystal projector.

An exemplary configuration of the liquid crystal projector 200 will now be described. First, the circuit system of the liquid crystal projector 200 will be described. FIG. 2 illustrates an exemplary configuration of the circuit system of the liquid crystal projector 200.

The liquid crystal projector 200 includes a controller 201 and a user interface unit 202. In addition, the liquid crystal projector 200 also includes signal input ports 203R, 203G, and 203B, image processing circuits 204R, 204G, and 204B, color correction circuits 205R, 205G, and 205B, and gamma correction circuits 206R, 206G, and 206B. The liquid crystal projector 200 furthermore includes panel drivers 207R, 207G, and 207B, and liquid crystal panels 208R, 208G, and 208B. Herein, the liquid crystal panel 208R is a liquid crystal panel for red images, the liquid crystal panel 208G is a liquid crystal panel for green images, and the liquid crystal panel 208B is a liquid crystal panel for blue images.

The controller 201 controls the operation of the respective components of the circuit system. The controller 201 is provided with a CPU 201a, ROM 201b, and RAM 201c. The CPU 201a controls the respective components of the circuit system by reading software and data from the ROM 201b, loading the software and data into the RAM 201c, and then activating the software. The user interface unit 202 provides a user interfaces, and is connected to the controller 201. The user interface unit 202 may include keys, buttons, or dials disposed on the chassis (not shown) of the liquid crystal projector 200, or a remote control, for example.

The signal input ports 203R, 203G, and 203B that respectively receive a red (R), green (G), and blue (B) image signal as input. The image processing circuits 204R, 204G, and 204B respectively process the respective color image signals input into the signal input ports 203R, 203G, and 203B, conducting processing such as picture control, scaling, and noise reduction processing. The picture control includes contrast, brightness, and color control, for example.

Figure 3:
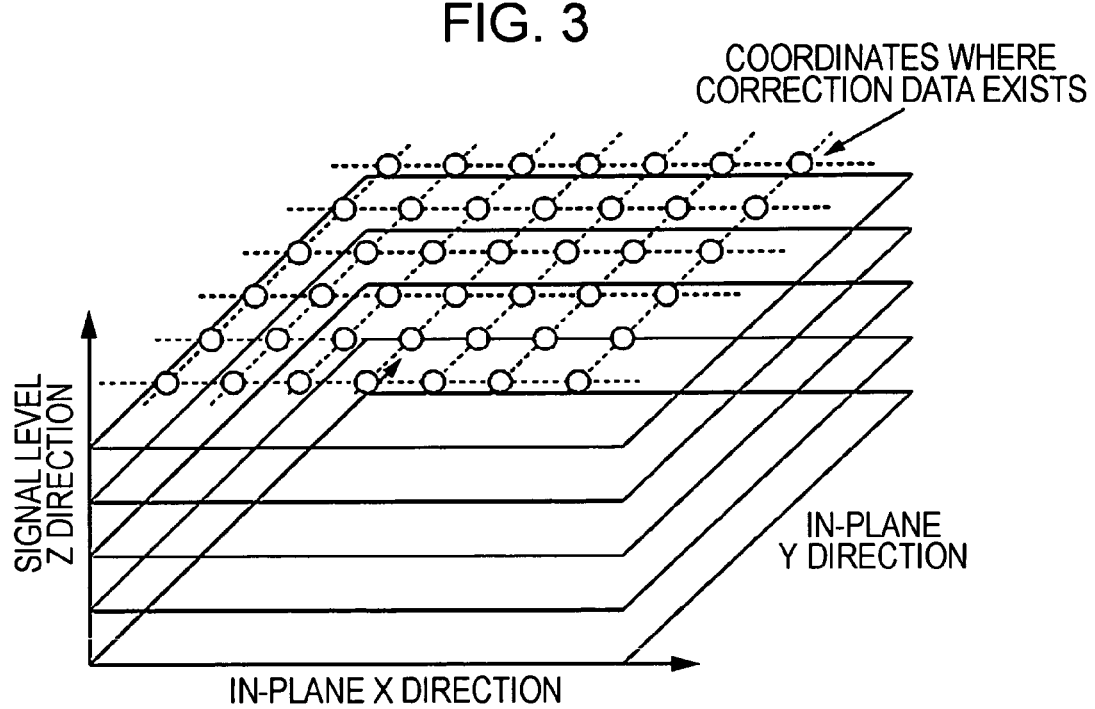
FIG. 3 is a diagram for explaining correction data kept in a lookup table of a color correction circuit.

The color correction circuits 205R, 205G, and 205B respectively conduct color correction processing with respect to the color image signals respectively output from the image processing circuits 204R, 204G, and 204B. Each color correction circuit references a lookup table (LUT) that stores correction data for a plurality of signal levels in each region (i.e., correction point) obtained by dividing the picture at fixed intervals in both the horizontal (X) and the vertical (Y) directions, as shown in FIG. 3. In the present case, the lookup table only stores correction data for fixed-interval coordinate positions in the X and Y directions.

Using the correction data stored in the lookup table, each color correction circuit generates correction data for an input color image signal by means of 3D interpolation in the horizontal direction, the vertical direction, and a signal level direction. The interpolation may be conducted using spline functions, for example. Subsequently, each color correction circuit adds the correction data generated by interpolation to a respective input color image signal, and thus obtains a color-corrected output color image signal.

The gamma correction circuits 206R, 206G, and 206B respectively perform gamma correction with respect to the color image signals respectively output from the color correction circuits 205R, 205G, and 205B. More specifically, each gamma correction circuit applies gamma to a respective input color image signal using the reverse of the gamma characteristics exhibited by the corresponding liquid crystal panel. As a result, an output color image signal is obtained.

On the basis of color image signals respectively output from the gamma correction circuits 206R, 206G, and 206B, the panel drivers 207R, 207G, and 207B respectively drive the liquid crystal panels 208R, 208G, and 208B, and display red, green, and blue color images.

The operation of the circuit system of the liquid crystal projector 200 shown in FIG. 2 will now be described. First, red (R), green (G), and blue (B) image signals are respectively input into the signal input ports 203R, 203G, and 203B. The color image signals are then input into the image processing circuits 204R, 204G, and 204B. In the image processing circuits 204R, 204G, and 204B, the color image signals are respectively processed for picture control, scaling, and noise reduction, for example.

The color image signals respectively output from the image processing circuits 204R, 204G, and 204B are supplied to the color correction circuits 205R, 205G, and 205B. In the color correction circuits 205R, 205G, and 205B, the color image signals are respectively color-corrected on the basis of the correction data stored in the lookup table. In the present case, correction data corresponding to the input color image signals is interpolated in real-time in each color correction circuit, on the basis of the correction data stored in the lookup table (see FIG. 3). The interpolated correction data is then added to the input color image signals.

The color image signals respectively output from the color correction circuits 205R, 205G, and 205B are supplied to the gamma correction circuits 206R, 206G, and 206B. In the gamma correction circuits 206R, 206G, and 206B, the color image signals are respectively gamma-corrected. The color image signals respectively output from the gamma correction circuits 206R, 206G, and 206B are supplied to the panel drivers 207R, 207G, and 207B.

In the panel drivers 207R, 207G, and 207B, the liquid crystal panels 208R, 208G, and 208B are respectively driven on the basis of the color image signals respectively output from the gamma correction circuits 206R, 206G, and 206B. In so doing, red, green, and blue color images corresponding to the red, green, and blue image signals that were input into the signal input ports 203R, 203G, and 203B are displayed on the liquid crystal panels 208R, 208G, and 208B.

Figure 4:
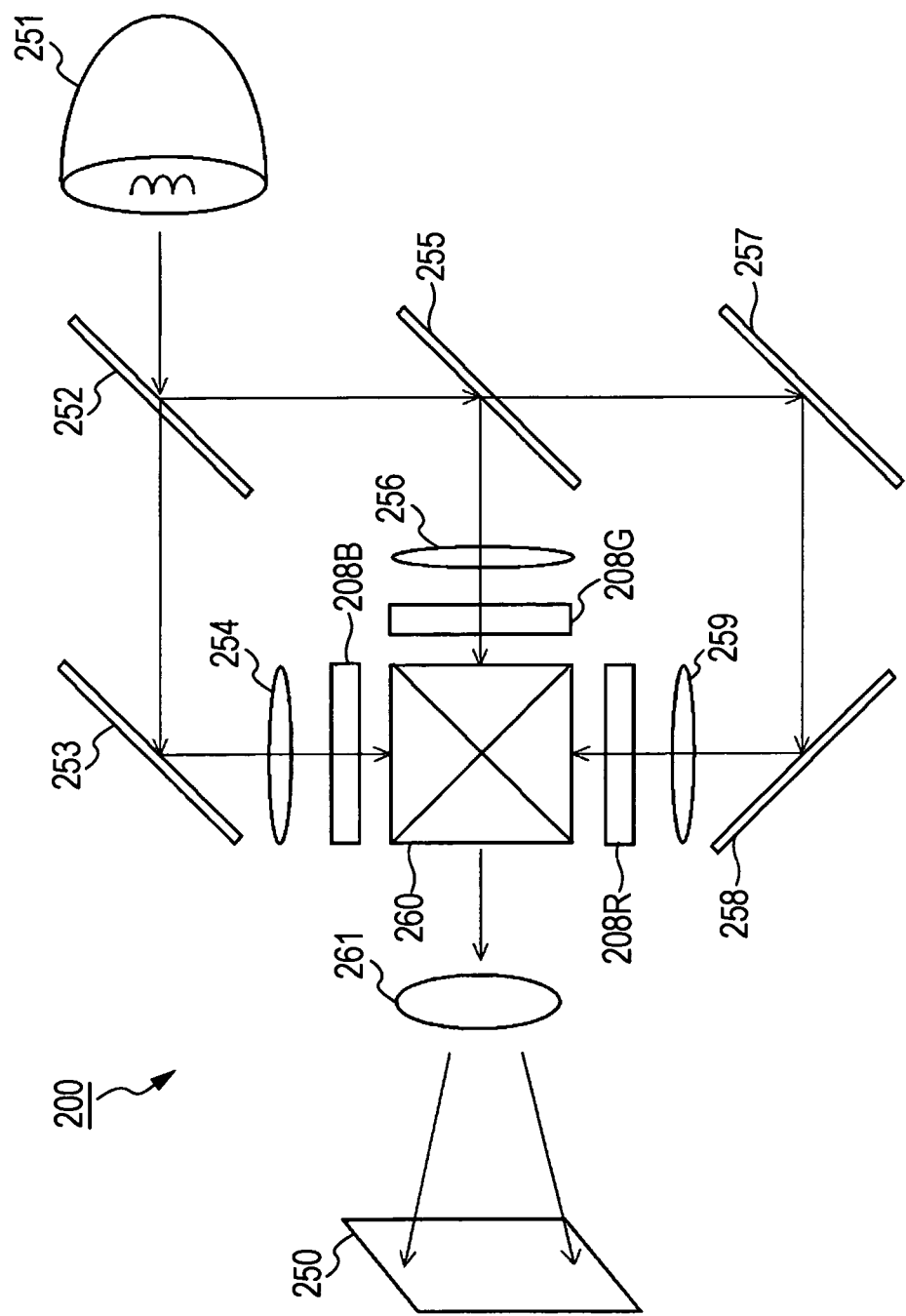
FIG. 4 is a block diagram illustrating an exemplary configuration of optics in a liquid crystal projector.

The optics of the liquid crystal projector 200 will now be described. FIG. 4 illustrates an exemplary configuration of the optics of the liquid crystal projector 200. In FIG. 4, white light emitted from a light source 251 is separated into specific color components by a first beam splitter 252. For example, the first beam splitter 252 may transmit only blue (B) light components (blue light having the shortest wavelengths), and reflect the light components of the remaining colors. The B light components transmitted by the first beam splitter 252 have their light path altered by a mirror 253, pass through a lens 254, and irradiate the blue-image liquid crystal panel 208B.

The light components that were reflected by the first beam splitter 252 travel to a second beam splitter 255, where green (G) light components are reflected and red (R) light components are transmitted, for example. The G light components reflected by the second beam splitter 255 pass through a lens 256 and irradiate the green-image liquid crystal panel 208G. The R light components transmitted by the second beam splitter 255 have their light path altered by mirrors 257 and 258, pass through a lens 259, and irradiate the red-image liquid crystal panel 208R.

The R, G, and B light illuminating the liquid crystal panels 208R, 208G, and 208B are recombined by a cross prism 260. The recombined light emitted from the cross prism 260 is then projected onto the screen 250 by a projection prism 261. In so doing, the pictures from the liquid crystal panels 208R to 208B are projected onto the screen 250, and a color image is displayed on the screen 250.

[Function of PC (Personal Computer)]

Figure 5:
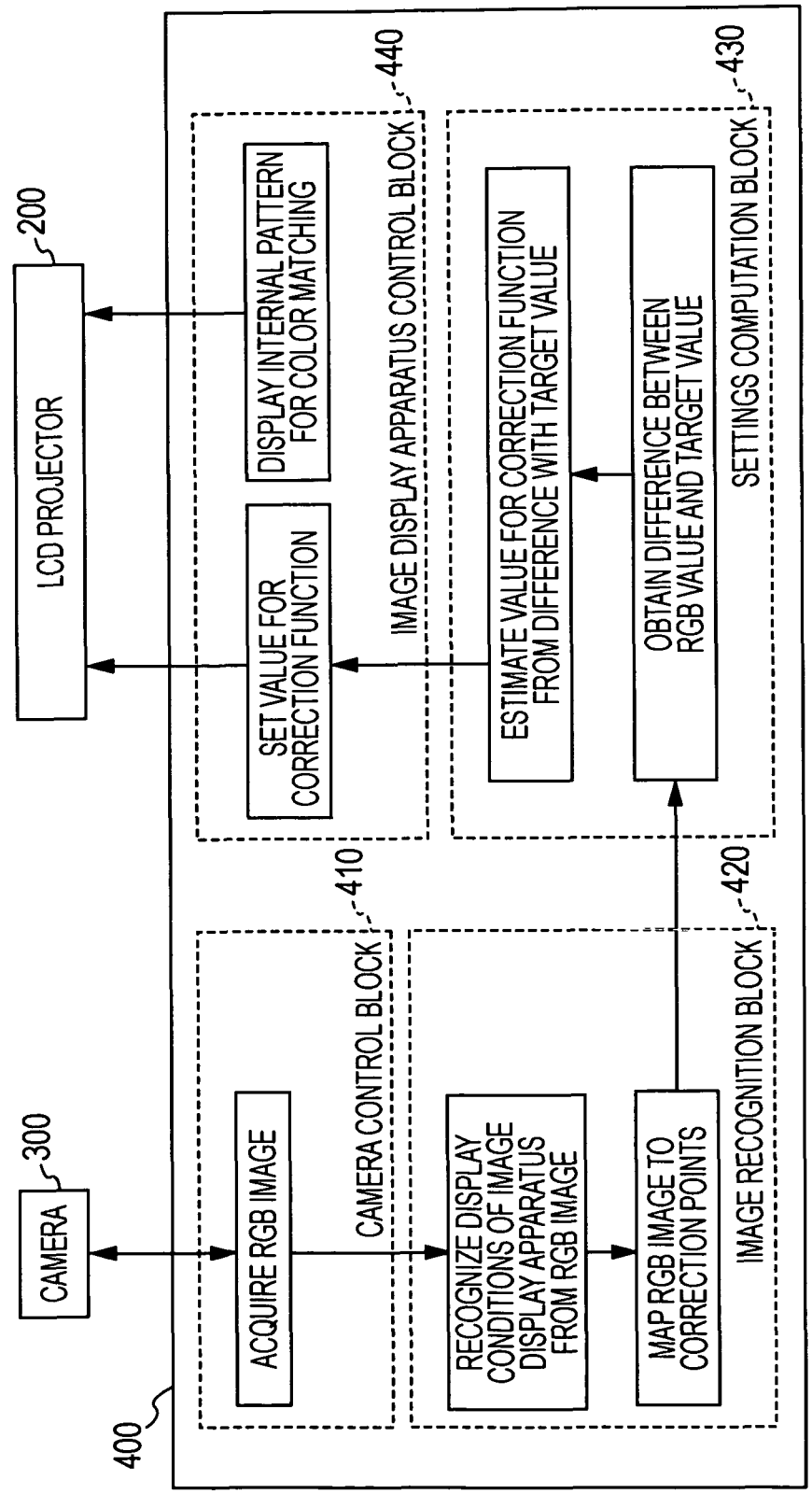
FIG. 5 is a block diagram for explaining functional blocks of a personal computer functioning as a correction data setting apparatus.

The PC 400 functions as a correction data setting apparatus. As shown in FIG. 5, the PC 400 has functional blocks including a camera control block 410, an image recognition block 420, a set value computing block 430, and an image display apparatus control block 440.

From the camera 300, the camera control block 410 acquires the red (R), green (G), and blue (B) image signals obtained by capturing the picture on the screen 250 (see FIG. 1). The image recognition block 420 processes the color image signals acquired by the camera control block 410, and recognizes the correspondence between respective correction points on the picture from the liquid crystal projector 200 and positions in the captured picture.

The image recognition block 420 first processes the color image signals acquired by the camera control block 410 and recognizes the display state of the image display apparatus (i.e., the liquid crystal projector 200) from the R, G, and B capture images. The recognition of the display state herein includes recognition of conditions such as top-down and left-right inversions, as well as four-corner recognition.

The image recognition block 420 conducts four-corner recognition. More specifically, from among the respective correction points on the picture from the liquid crystal projector 200, the image recognition block 420 recognizes the positions in the captured picture corresponding to the correction points at the four corners of the picture portion captured by the camera 300. Herein, the picture from the liquid crystal projector 200 refers to the pictures on the liquid crystal panels.

When conducting the above four-corner recognition processing in the image recognition block 420, the image display apparatus control block 440 changes the correction data corresponding to the above four-corner correction points set in the lookup table of the color correction circuits 205R, 205G, and 205B into data for emphasizing those correction points.

The data for emphasizing correction points herein may be determined on the basis of the averaged correction data for nearby correction points. For example, assume that the correction data for the red (R), green (G), and blue (B) image signals is adjustable within a range from +127 to −128, respectively. If the averaged correction data for nearby correction points in the red, green, and blue image signals is R: 20, G: −10, and B: 30, then the correction data for emphasis may be set to R: −128, G: 127, B: −128, for example.

Figure 6A:
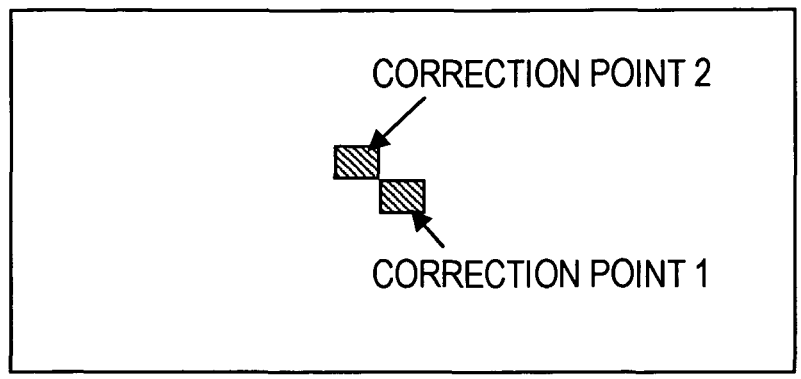
FIG. 6A illustrates an exemplary image wherein, among respective correction points on a picture from a liquid crystal projector, the correction points to be recognized as corresponding to positions on a captured picture have been emphasized.
Figure 6B:
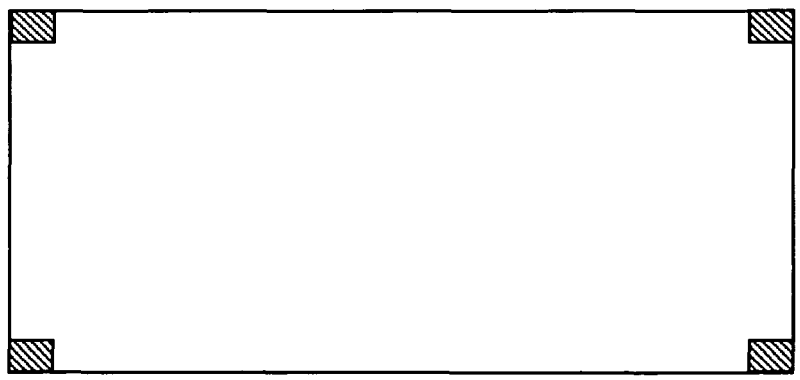
FIG. 6B illustrates an exemplary image wherein, among respective correction points on a picture from a liquid crystal projector, the correction points to be recognized as corresponding to positions on a captured picture have been emphasized.

When changing the correction data for the four-corner correction points into data for emphasizing those correction points as described above, the regions of the four-corner correction points on the picture from the liquid crystal projector 200 become colored so as to be clearly distinguished from nearby correction points, as shown in FIG. 6B. In four-corner recognition, the image recognition block 420 processes the color image signals acquired by the camera control block 410, and extracts the portions that have been emphasized as described above from the captured picture.

It should be appreciated that the image recognition block 420 does not recognize the positions in the captured picture corresponding to the four-corner correction points all at once. Rather, the image recognition block 420 recognizes each corner in succession, proceeding from upper-left, to upper-right, to lower-left, to lower-right, for example. For this reason, the above changing of the correction data in order to emphasize the four-corner correction points is also conducted in succession.

Meanwhile, the picture from the liquid crystal projector 200 might be displayed inverted left to right, top to bottom, or in both directions with respect to the screen 250. If such an inverted state exists (i.e., if the inverted state of the captured picture is not acknowledged) when the image recognition block 420 attempts to recognize the position in the captured picture corresponding to the correction point for a given corner by searching for an emphasized position as described above, then the image recognition block 420 might not be able to narrow the search range.

Consequently, in the present embodiment, before conducting the above four-corner recognition, the image recognition block 420 conducts processing to recognize states such as the following top-down or left-right inversions. More specifically, the image recognition block 420 processes the color image signals acquired by the camera control block 410, and recognizes positions in the captured picture corresponding to a first and a second correction point. The first correction point is located in the center of the picture from the liquid crystal projector 200, while the second correction point is shifted away from the first correction point in both the top-down and left-right directions.

When conducting the above recognition processing, the image display apparatus control block 440 changes the correction data to be set in the lookup table of the color correction circuits 205R, 205G, and 205B into data for emphasizing the correction points, similarly to that of the above four-corner recognition.

When changing the correction data for the first and second correction points into data for emphasizing those correction points as described above, the regions of the first and second correction points on the picture from the liquid crystal projector 200 become colored so as to be clearly distinguished from nearby correction points, as shown in FIG. 6A. By way of example, FIG. 6A illustrates the case wherein a correction point located to the upper-left of the first correction point has been selected as the second correction point.

The image recognition block 420 is able to determine the inverted state of the captured picture by recognizing the positions in the captured picture corresponding to the first and second correction points. For example, consider the case wherein the second correction point is located to the upper-left of the first correction point.

In this case, if the position in the captured picture corresponding to the second correction point is above and to the left of the position corresponding to the first correction point, then the image recognition block 420 determines that no top-down or left-right inversion exists. If the position in the captured picture corresponding to the second correction point is below and to the left of the position corresponding to the first correction point, then the image recognition block 420 determines that only top-down inversion exists.

If the position in the captured picture corresponding to the second correction point is above and to the right of the position corresponding to the first correction point, then the image recognition block 420 determines that only left-right inversion exists. If the position in the captured picture corresponding to the second correction point is below and to the right of the position corresponding to the first correction point, then the image recognition block 420 determines that both top-down and left-right inversion exist.

When the captured picture is top-down or left-right inverted, the image recognition block 420 conducts image conversion to put the captured picture in a normal display state, and subsequently conducts the above four-corner recognition. By putting the captured picture in a normal display state in this way, the image recognition block 420 is able to narrow the search range when searching for emphasized positions as described above in order to recognize the position in the captured picture corresponding to a region for a given corner, and processing is simplified.

Meanwhile, in the liquid crystal projector 200, the picture from the liquid crystal panels might be projected such that its edges spill off the screen. Furthermore, even if the entire picture from the liquid crystal panels is projected onto the screen, mattes might be disposed upon the screen 250, and the picture might be displayed with its left and right portions cut off. Consequently, it might not be the case that the picture portion captured by the camera 300 corresponds to the entire picture in the liquid crystal projector 200.

For this reason, the image recognition block 420 conducts a first and a second process as described below in order to recognize to recognize the positions in the captured picture corresponding to the correction points at the corners of the picture portion captured by the camera 300. More specifically, the image recognition block 420 first conducts a first process to recognize the position in the captured picture corresponding to a first correction point at one corner of the picture in the liquid crystal projector 200.

If the image recognition block 420 is unable to recognize the position in the captured pictured corresponding to the first correction point in the first process, then the image recognition block 420 subsequently conducts a second process to recognize a position in the captured picture corresponding to a correction point near the first correction point. In so doing, the image recognition block 420 is able to recognize positions in the captured picture corresponding to the correction points at the corners of the picture portion captured by the camera 300, even if the picture portion captured by the camera 300 does not correspond to the entire picture from the liquid crystal projector 200.

Figure 7A:
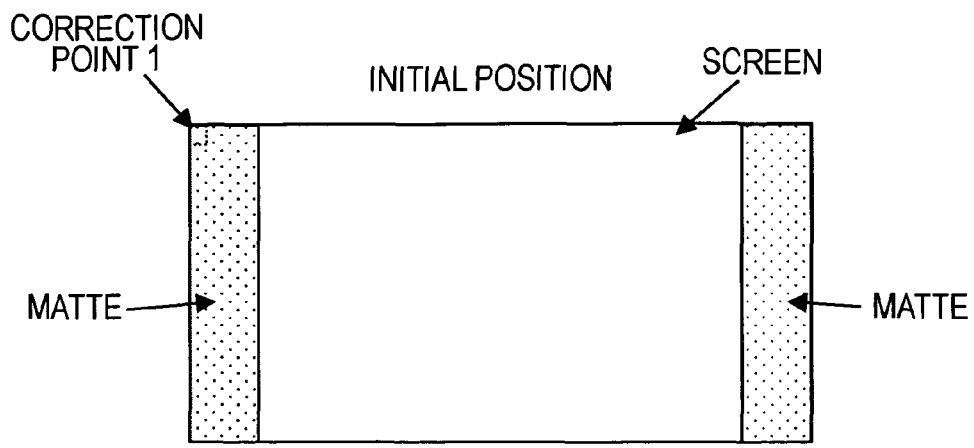
FIG. 7A illustrates an example of an image corresponding to the screen of a rear projector (i.e., a screen image) existing in a captured picture.
Figure 7B:
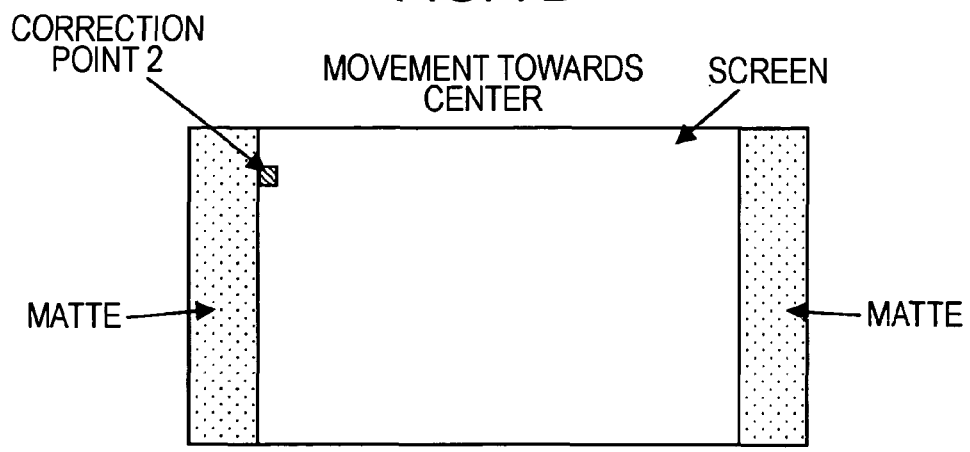
FIG. 7B illustrates an example of an image corresponding to the screen of a rear projector (i.e., a screen image) existing in a captured picture.
Figure 7C:
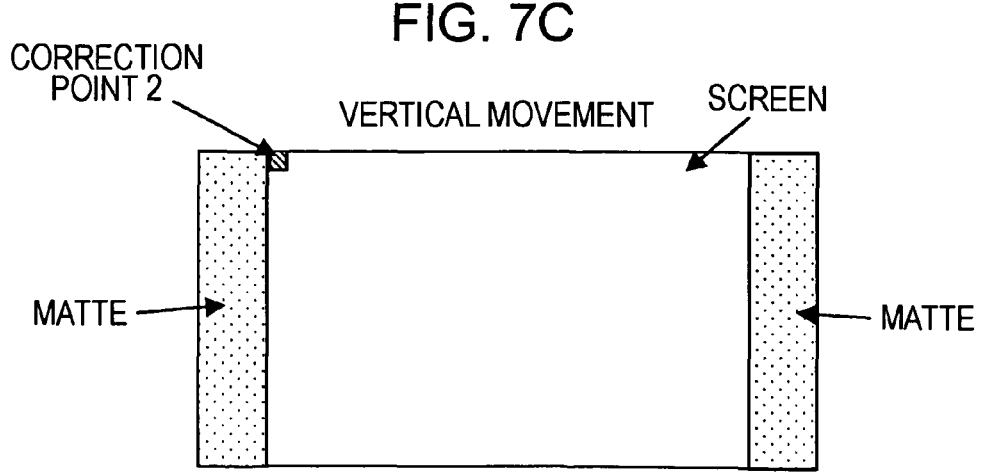
FIG. 7C illustrates an example of an image corresponding to the screen of a rear projector (i.e., a screen image) existing in a captured picture.

An example will now be described wherein the liquid crystal projector 200 is a rear projector, mattes are provided to the left and right of the screen 250, and an image is projected onto the screen 250 with its left and right portions cut off as a result. FIGS. 7A to 7C illustrate images corresponding to the screen 250 (i.e., screen images) and existing in the captured pictures.

FIG. 7A illustrates a screen image in the case of the above first process, wherein a first correction point corresponding to a corner of the picture from the liquid crystal projector 200 is recognized. In this case, the first correction point is recognized, but covered by a matte, and thus the image recognition block 420 does not recognized the emphasized portion. In other words, the image recognition block 420 does not recognize the position in the captured picture corresponding to the first correction point.

Consequently, the image recognition block 420 conducts the second process. In this case, the second correction point to be recognized is successively shifted away from the first correction point towards the picture center. FIG. 7B illustrates a screen image in the case where the second correction point has been shifted to a position not covered by a matte. In this case, the image recognition block 420 is able to recognize the emphasized portion. In other words, the image recognition block 420 is able to recognize the position in the captured picture corresponding to the second correction point. Subsequently, as shown in FIG. 7C, the second correction point is moved to a corner of the picture portion actually being displayed on the screen 250, and the image recognition block 420 recognizes the position in the captured picture corresponding to that correction point. The details of this four-corner recognition process will be given later.

By means of the above four-corner recognition process, the image recognition block 420 is able to recognize positions in the captured picture corresponding to correction points at the corners of the picture portion captured by the camera 300. Subsequently, on the basis of the recognition results, the image recognition block 420 maps the R, G, and B captured images with respect to the correction points on the picture from the liquid crystal projector 200. In so doing, the image recognition block 420 recognizes the correspondence between the respective correction points on the picture from the liquid crystal projector 200 and positions in the captured picture.

For this reason, by using the correspondence between the above four-corner and center correction points on the picture from the liquid crystal projector 200 and their corresponding positions in the captured picture, the image recognition block 420 converts the R, G, and B captured images such that the shape of the picture portion from the liquid crystal projector 200 in the captured picture matches the shape of the original picture in the liquid crystal projector 200. FIG. 8A illustrates an example of such an image before conversion, while FIG. 8B illustrates an example of such an image after conversion.

When setting the correction data, the set value computing block 430 uses the mapping results obtained by the image recognition block 420 to compute correction data for each correction point on the picture from the liquid crystal projector 200. Furthermore, when setting the correction data, the image display apparatus control block 440 controls the liquid crystal projector 200 such that an internal pattern for color matching (i.e., a gray or white picture) is displayed. In other words, when computing correction data for a given signal level, the image display apparatus control block 440 causes red (R), green (G), and blue (B) image signals at the given signal level to be supplied from the image processing circuits 204R, 204G, and 204B to the color correction circuits 205R, 205G, and 205B.

When, for example, the set value computing block 430 solves for correction data for the red (R) image signal at the respective correction points on the picture from the liquid crystal projector 200, the following processing is conducted. First, the set value computing block 430 uses the mapping results obtained by the image recognition block 420 to solve for the average value of a plurality of pixel signals corresponding to a correction point from among the plurality of pixel signals constituting the red image signal, and acquires the difference with a target value. Next, the set value computing block 430 estimates, for each correction point, a value for the correction function (i.e., correction data) from the difference with the target value.

When, for example, the set value computing block 430 solves for correction data for the green (G) or blue (B) image signals at the respective correction points on the picture from the liquid crystal projector 200, processing similar to that of the above case of solving for correction data for the red (R) image signal is conducted. The set value computing block 430 computes correction data for a plurality of signals levels similarly to the above.

When setting the correction data, the image display apparatus control block 440 sets the correction data for the per-color image signals computed as described above by the set value computing block 430 in the lookup table of the color correction circuits 205R, 205G, and 205B. In addition, when the image display apparatus control block 440 conducts the above four-corner recognition or similar processing, the correction data for the correction points to be emphasized is temporarily changed into data for emphasizing those correction points. Furthermore, when setting the correction data, the image display apparatus control block 440 also controls the liquid crystal projector 200 such that an internal pattern for color matching (i.e., a gray or white picture) is displayed, as described above.

[Specific Example of Four-Corner Recognition]

Hereinafter, a specific example will be described for the processing to recognize positions on a captured picture corresponding to correction points at the corners of the picture portion captured by the camera 300 from among the respective correction points on a picture from the liquid crystal projector 200. The example herein describes the case wherein the picture from the liquid crystal projector 200 has been divided into 10 parts in both the horizontal and vertical directions, resulting in the correction points (i.e., regions) 1 to 100, as shown in FIG. 9.

Figure 10:
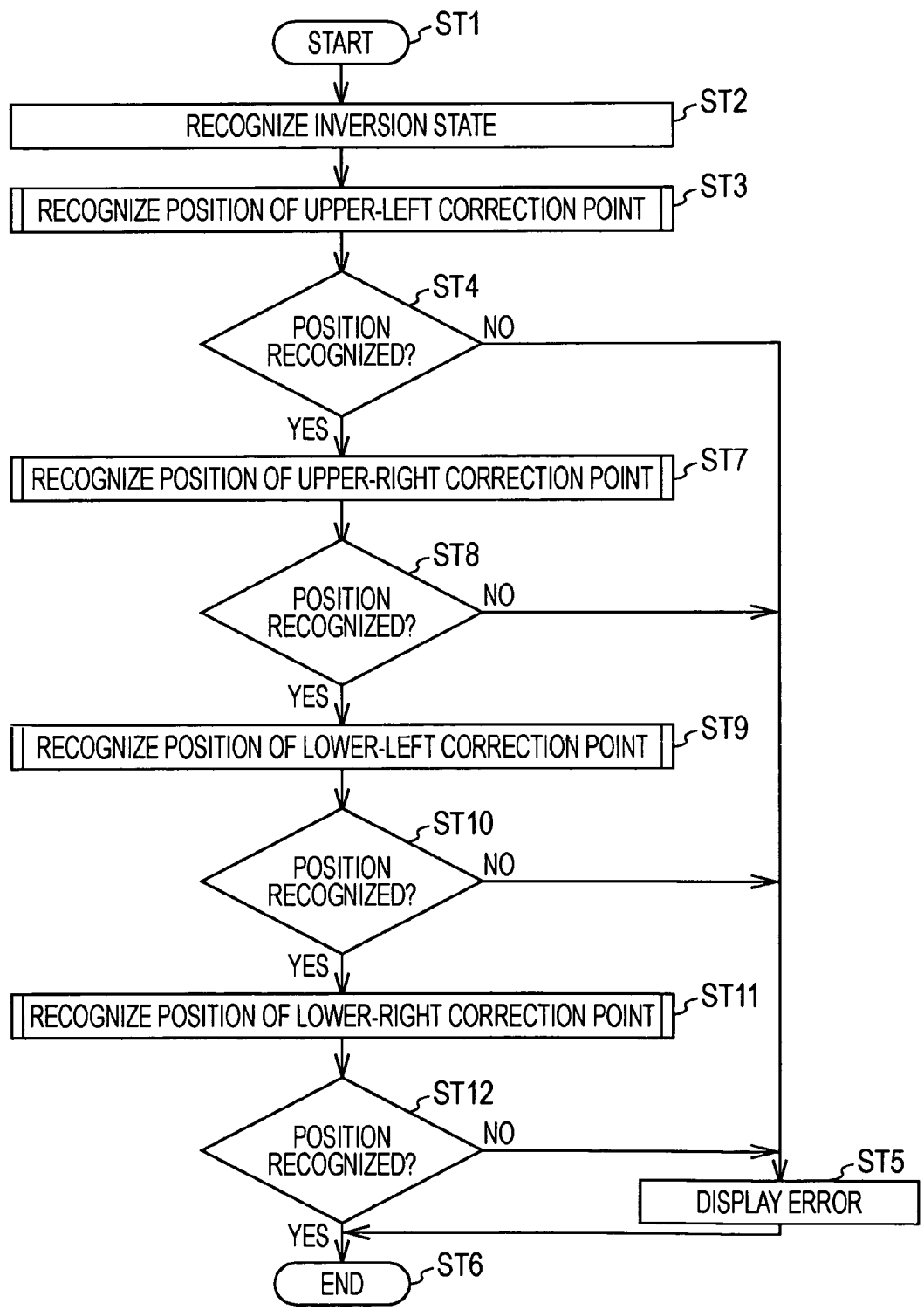
FIG. 10 is a flowchart illustrating an exemplary processing sequence for a four-corner recognition process in a personal computer.

The flowchart in FIG. 10 illustrates an exemplary processing sequence for four-corner recognition in the PC 400.

First, in step ST1, the PC 400 initiates the process and subsequently transitions to step ST2. In step ST2, the PC 400 recognizes conditions such as top-down and left-right inversion. If the captured picture is top-down or left-right inverted, then the PC 400 converts the captured picture to a normal display state.

Next, in step ST3, the PC 400 conducts processing to recognize the position of the upper-left correction point. Then, in step ST4, the PC 400 determines whether or not the position was recognized. If the position was not recognized, then the PC 400 causes the display unit to display an error in step ST5, and terminates the process in the following step ST6.

If the position was recognized in step ST4, then the PC 400 transitions to step ST7. In step ST7, the PC 400 conducts processing to recognize the position of the upper-right correction point. Then, in step ST8, the PC 400 determines whether or not the position was recognized. If the position was not recognized, then the PC 400 causes the display unit to display an error in step ST5, and terminates the process in the following step ST6.

If the position was recognized in step ST8, then the PC 400 transitions to step ST9. In step ST9, the PC 400 conducts processing to recognize the position of the lower-left correction point. Then, in step ST10, the PC 400 determines whether or not the position was recognized. If the position was not recognized, then the PC 400 causes the display unit to display an error in step ST5, and terminates the process in the following step ST6.

If the position was recognized in step ST10, then the PC 400 transitions to step ST11. In step ST11, the PC 400 conducts processing to recognize the position of the lower-right correction point. Then, in step ST12, the PC 400 determines whether or not the position was recognized. If the position was not recognized, then the PC 400 causes the display unit to display an error in step ST5, and terminates the process in the following step ST6.

Figure 11:
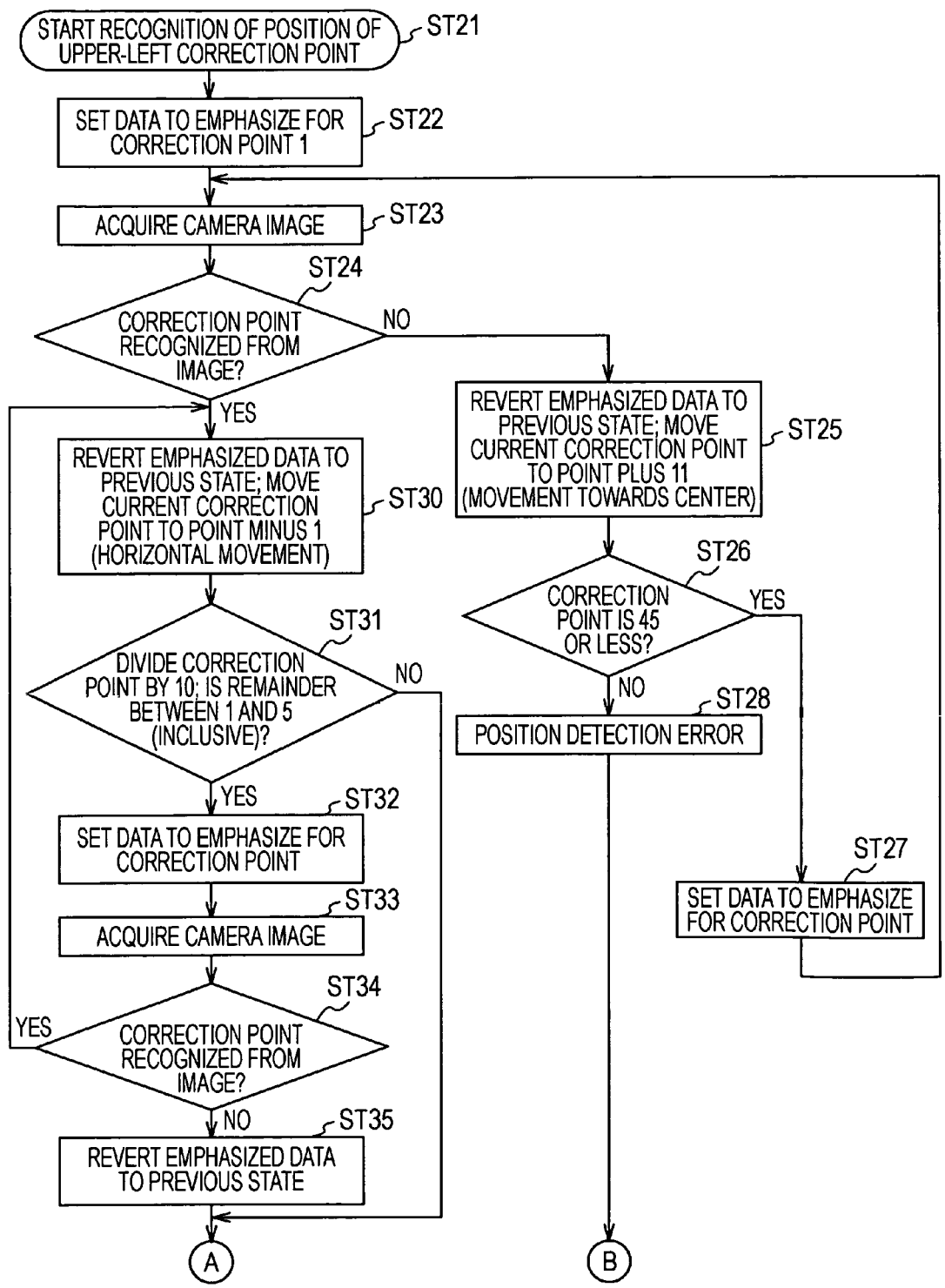
FIG. 11 is a flowchart (1/2) illustrating an exemplary processing sequence for an upper-left correction point recognition process in a personal computer.
Figure 12:
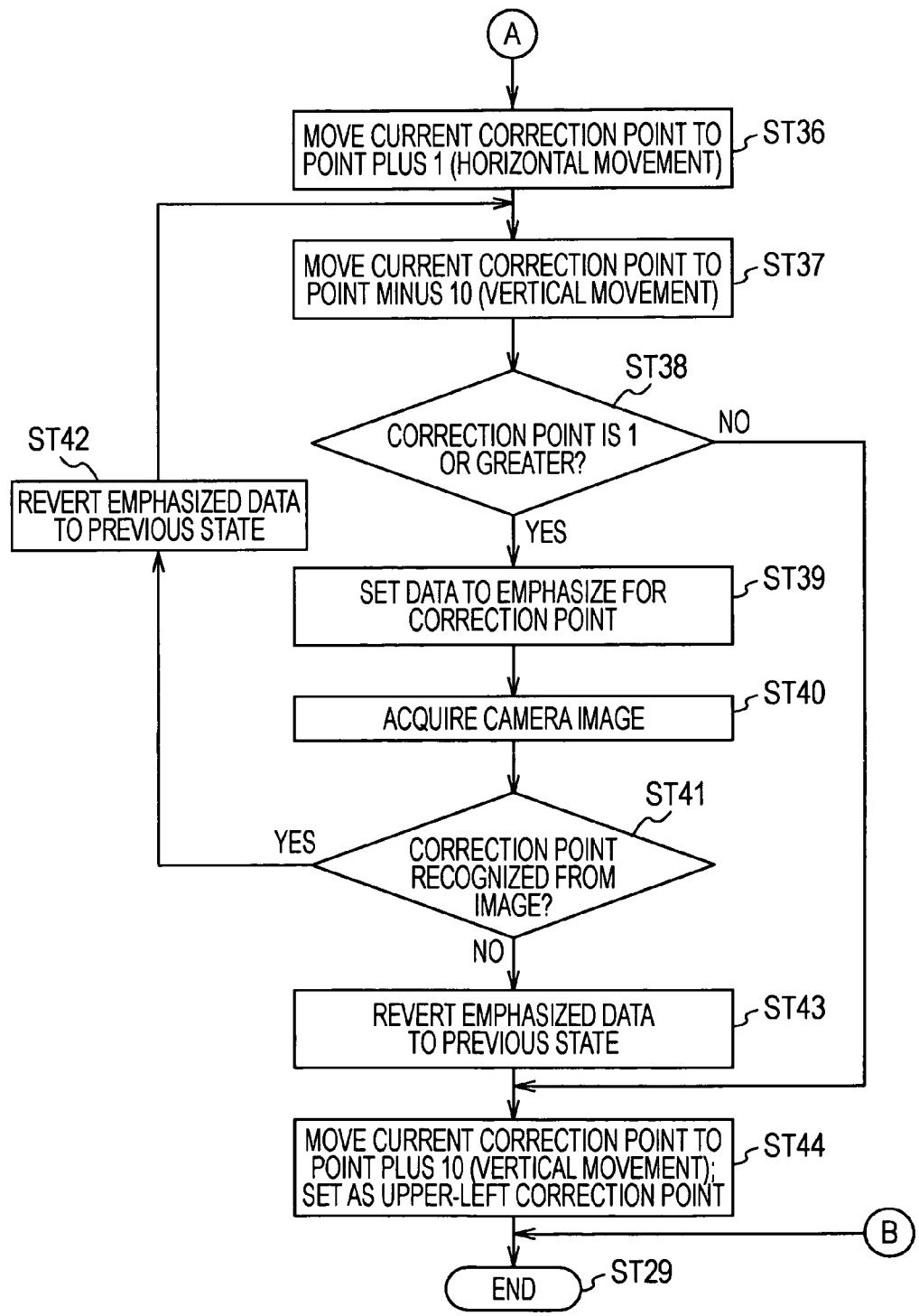
FIG. 12 is a flowchart (2/2) illustrating an exemplary processing sequence for an upper-left correction point recognition process in a personal computer.

The flowcharts in FIGS. 11 and 12 illustrate an exemplary processing sequence for upper-left correction point recognition (corresponding to step ST3 in FIG. 10) in the PC 400.

First, the PC 400 initiates the process in step ST21, and subsequently transitions to step ST22. In step ST22, the PC 400 sets the data to emphasize for the correction point 1.

Next, in step ST23, the PC 400 acquires a captured image (i.e., a captured image signal) from the camera 300. Then, in step ST24, the PC 400 determines whether or not the correction point was recognized from the captured image. If the correction point was not recognized, then the PC 400 transitions to step ST25.

In step ST25, the PC 400 reverts the emphasized data back to its previous state, and moves the current correction point to the point plus 11. In this case, the correction point moves towards the center of the picture, as indicated by the arrow in FIG. 9. Then, in step ST26, the PC 400 determines whether or not the correction point is 45 or less. When the correction point is 45 or less, the correction point still exists in the upper-left part of the plane, and thus the PC 400 sets the data to emphasize for the correction point in step ST27, and subsequently returns to the above step ST23.

If the correction point is determined in step ST26 to not be 45 or less, then the correction point is not in the upper-left part of the plane, and thus the PC 400 returns a detection error for position of the upper-left correction point, and subsequently terminates the process in step ST29.

If the correction point is recognized in the above step ST24, then in step ST30 the PC 400 reverts the emphasized data back to its previous state, and moves the current correction point to the point minus 1. In this case, the correction point is shifted 1 to the left in order to determine the point at the left edge. Then, in step ST31, the PC 400 divides the correction point by 10 and determines whether or not the remainder is between 1 and 5 (inclusive).

If the remainder is between 1 and 5, then the correction point still exists in the upper-left part of the plane, and thus the PC 400 sets the data to emphasize for the correction point in step ST32, and subsequently acquires the captured image (i.e., the captured image signal) from the camera 300 in step ST33. Then, in step ST34, the PC 400 determines whether or not the correction point was recognized from the captured image. If the correction point was recognized, then the PC 400 returns to step ST30, reverts the emphasized data back to its previous state, and moves the current correction point to the point minus 1.

If the correction point is not recognized in step S34, the results mean that the correction point was at the left edge before moving, and thus the PC 400 transitions to step ST35. In step ST35, the PC 400 reverts the emphasized data back to its previous state, and in step ST36, moves the current correction point to the point plus 1 (i.e., to the point at the left edge).

Next, in step ST37, the PC 400 moves the current correction point to the point minus 10. In this case, the correction point is shifted 1 upwards in order to determine the point at the top edge. Then, in step ST38, the PC 400 determines whether or not the correction point is 1 or greater.

If the correction point is 1 or greater, then the correction point still exists in the upper-left part of the plane, and thus the PC 400 sets the data to emphasize for the correction point in step ST39, and subsequently acquires the captured image (i.e., the captured image signal) from the camera 300 in step ST40. Then, in step ST41, the PC 400 determines whether or not the correction point was recognized from the captured image. If the correction point was recognized, then in step ST42 the PC 400 reverts the emphasized data back to its previous state, subsequently returns to step ST37, and moves the current correction point to the point minus 10.

If the correction point was not recognized in step ST41, the results mean that the correction point was at the top edge before moving, and thus in step ST43 the PC 400 reverts the emphasized data back to its previous state, and subsequently transitions to step ST44. If the correction point is not 1 or greater in the above step ST38, the results mean that the correction point was at the top edge before moving, and thus the PC 400 immediately transitions to step ST44.

In step ST44, the PC 400 sets the point plus 10 with respect to the current correction point as the upper-left correction point. In this case, the image recognition position of the upper-left correction point becomes the position in the captured picture corresponding to the upper-left correction point. After step ST44, the PC 400 terminates the process in step ST29.

Figure 13:
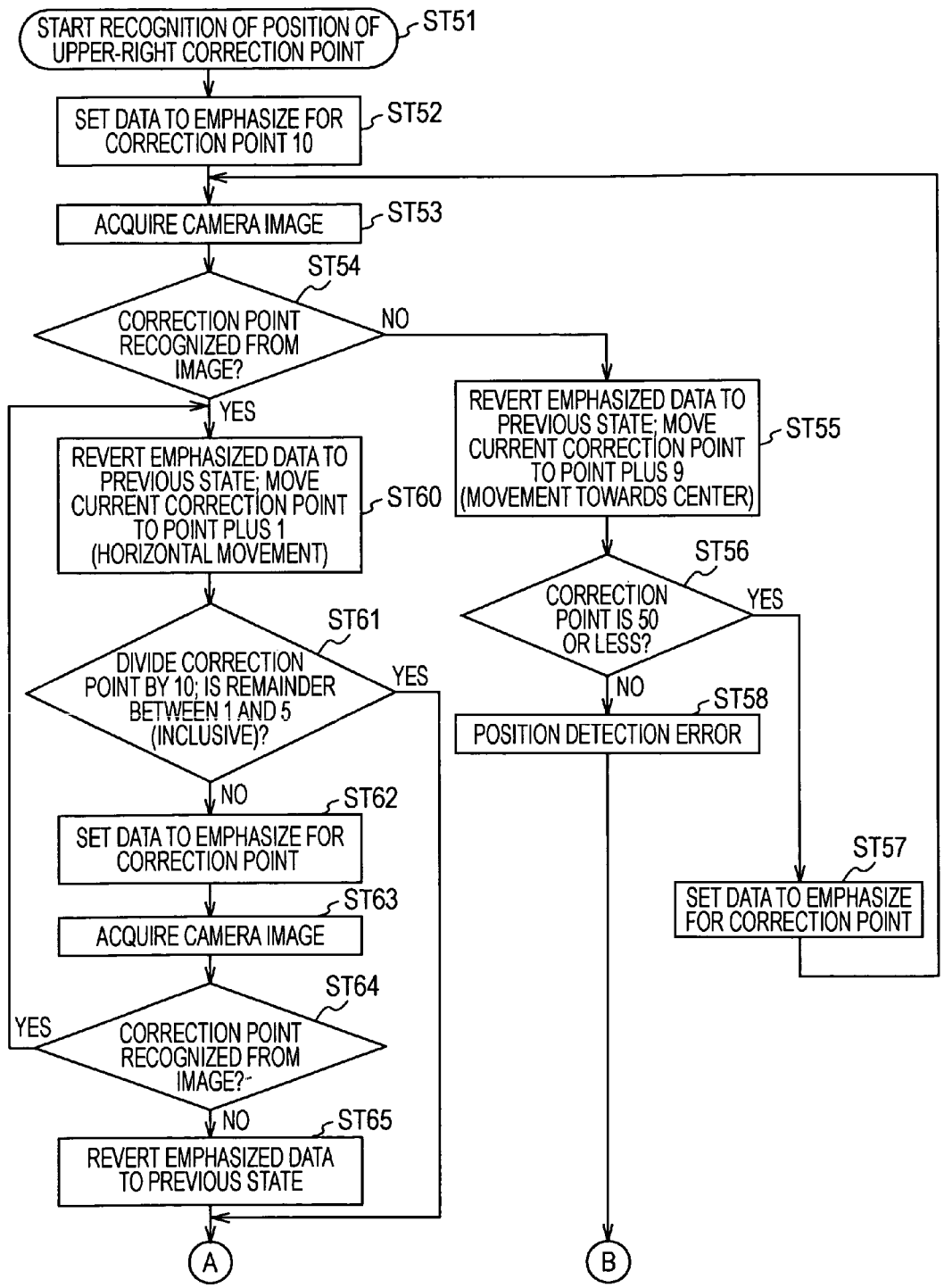
FIG. 13 is a flowchart (1/2) illustrating an exemplary processing sequence for an upper-right correction point recognition process in a personal computer.
Figure 14:
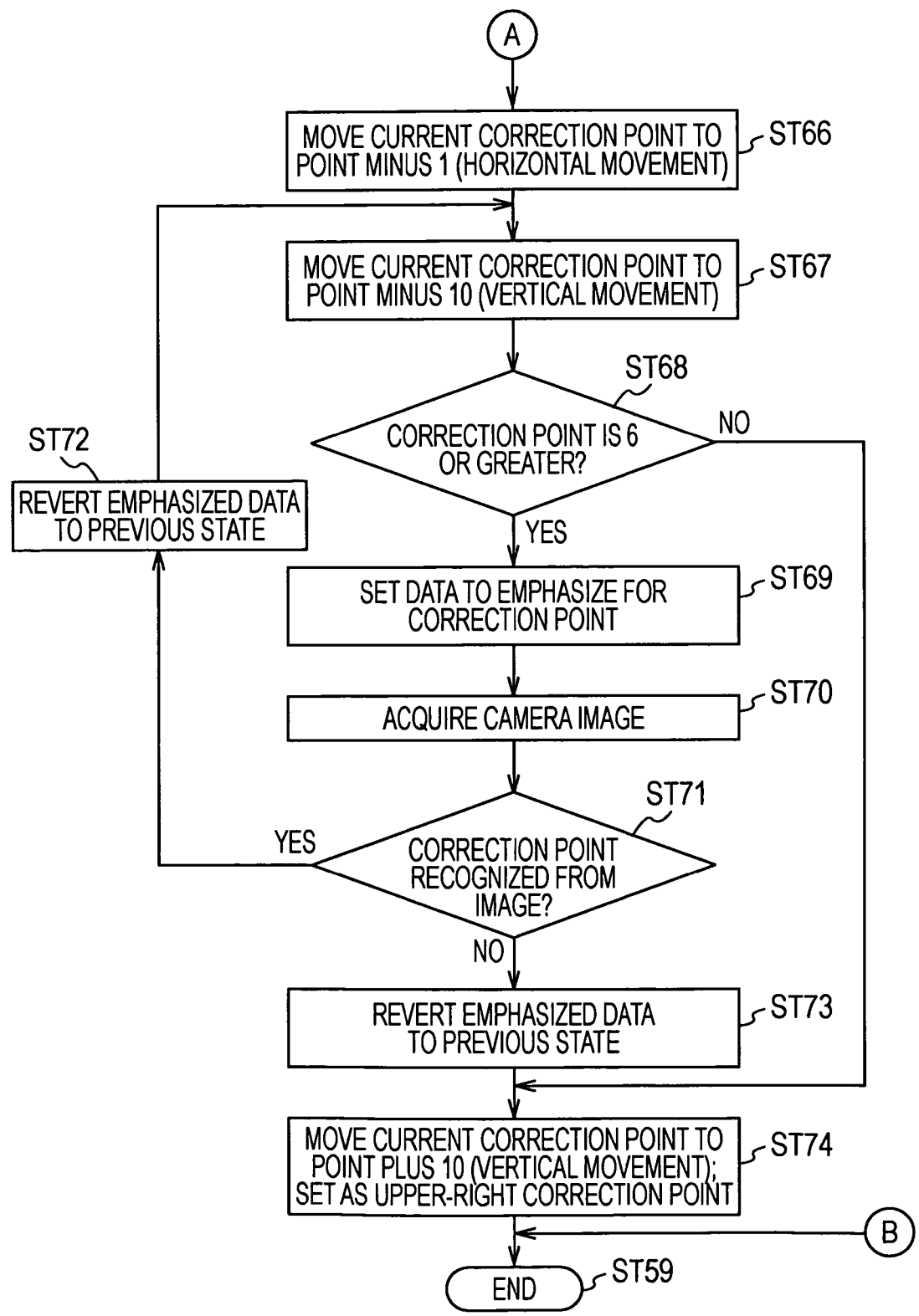
FIG. 14 is a flowchart (2/2) illustrating an exemplary processing sequence for an upper-right correction point recognition process in a personal computer.

The flowcharts in FIGS. 13 and 14 illustrate an exemplary processing sequence for upper-right correction point recognition (corresponding to step ST7 in FIG. 10) in the PC 400.

First, the PC 400 initiates the process in step ST51, and subsequently transitions to step ST52. In step ST52, the PC 400 sets the data to emphasize for the correction point 10.

Next, in step ST53, the PC 400 acquires a captured image (i.e., a captured image signal) from the camera 300. Then, in step ST54, the PC 400 determines whether or not the correction point was recognized from the captured image. If the correction point was not recognized, then the PC 400 transitions to step ST55.

In step ST55, the PC 400 reverts the emphasized data back to its previous state, and moves the current correction point to the point plus 9. In this case, the correction point moves towards the center of the picture. Then, in step ST56, the PC 400 determines whether or not the correction point is 50 or less. When the correction point is 50 or less, the correction point still exists in the upper-right part of the plane, and thus the PC 400 sets the data to emphasize for the correction point in step ST57, and subsequently returns to the above step ST53.

If the correction point is determined in step ST56 to not be 50 or less, then the correction point is not in the upper-right part of the plane, and thus the PC 400 returns a detection error for position of the upper-right correction point, and subsequently terminates the process in step ST59.

If the correction point is recognized in the above step ST54, then in step ST60 the PC 400 reverts the emphasized data back to its previous state, and moves the current correction point to the point plus 1. In this case, the correction point is shifted 1 to the right in order to determine the point at the right edge. Then, in step ST61, the PC 400 divides the correction point by 10 and determines whether or not the remainder is between 1 and 5 (inclusive).

If the remainder is between 1 and 5, then the correction point still exists in the upper-right part of the plane, and thus the PC 400 sets the data to emphasize for the correction point in step ST62, and subsequently acquires the captured image (i.e., the captured image signal) from the camera 300 in step ST63. Then, in step ST64, the PC 400 determines whether or not the correction point was recognized from the captured image. If the correction point was recognized, then the PC 400 returns to step ST60, reverts the emphasized data back to its previous state, and moves the current correction point to the point plus 1.

If the correction point is not recognized in step S64, the results mean that the correction point was at the right edge before moving, and thus the PC 400 transitions to step ST65. In step ST65, the PC 400 reverts the emphasized data back to its previous state, and in step ST66, moves the current correction point to the point minus 1 (i.e., to the point at the right edge).

Next, in step ST67, the PC 400 moves the current correction point to the point minus 10. In this case, the correction point is shifted 1 upwards in order to determine the point at the top edge. Then, in step ST68, the PC 400 determines whether or not the correction point is 6 or greater.

If the correction point is 6 or greater, then the correction point still exists in the upper-right part of the plane, and thus the PC 400 sets the data to emphasize for the correction point in step ST69, and subsequently acquires the captured image (i.e., the captured image signal) from the camera 300 in step ST70. Then, in step ST71, the PC 400 determines whether or not the correction point was recognized from the captured image. If the correction point was recognized, then in step ST72 the PC 400 reverts the emphasized data back to its previous state, subsequently returns to step ST67, and moves the current correction point to the point minus 10.

If the correction point was not recognized in step ST71, the results mean that the correction point was at the top edge before moving, and thus in step ST73 the PC 400 reverts the emphasized data back to its previous state, and subsequently transitions to step ST74. If the correction point is not 6 or greater in the above step ST68, the results mean that the correction point was at the top edge before moving, and thus the PC 400 immediately transitions to step ST74.

In step ST74, the PC 400 sets the point plus 10 with respect to the current correction point as the upper-right correction point. In this case, the image recognition position of the upper-right correction point becomes the position in the captured picture corresponding to the upper-right correction point. After step ST74, the PC 400 terminates the process in step ST59.

Figure 15:
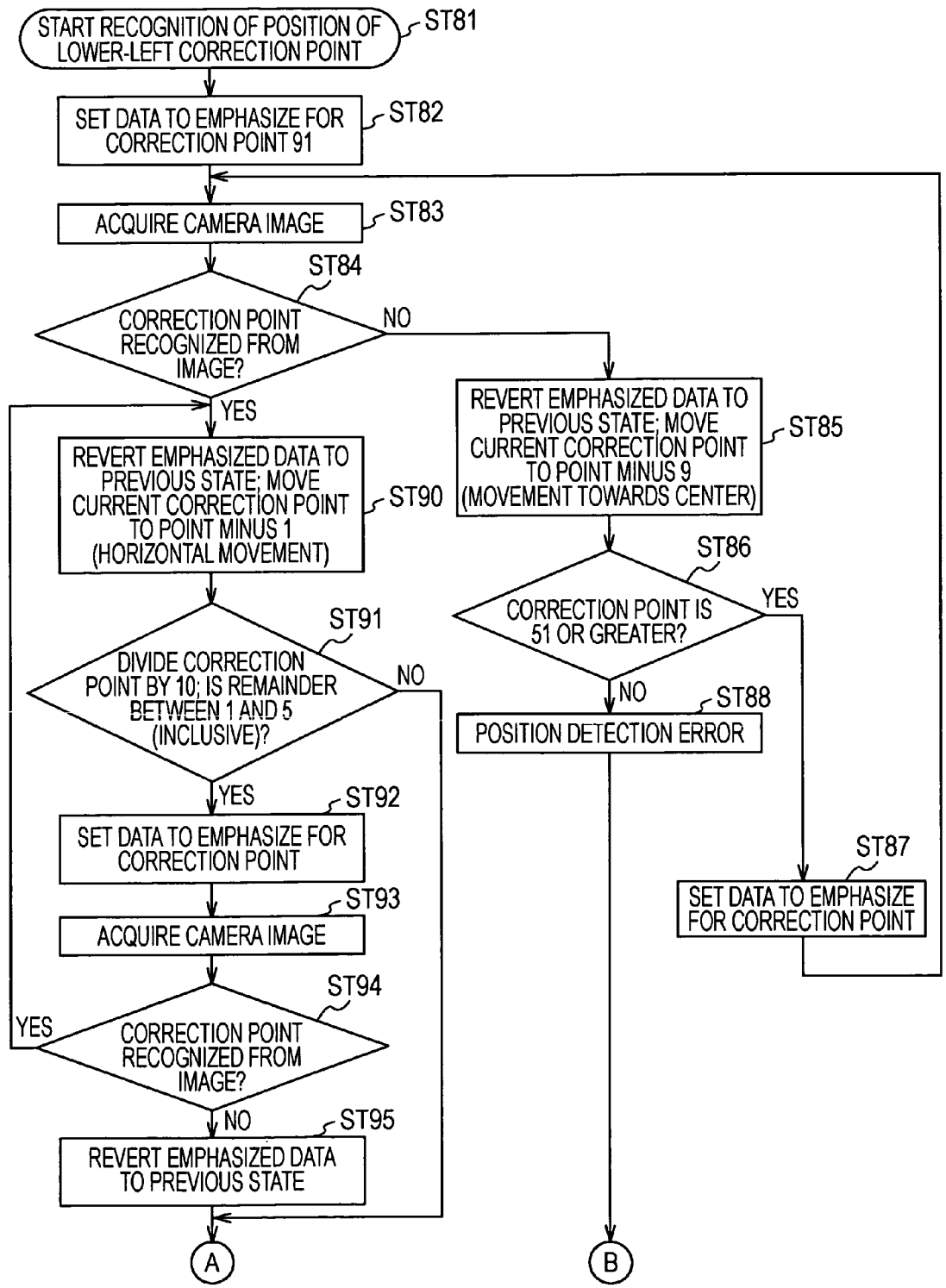
FIG. 15 is a flowchart (1/2) illustrating an exemplary processing sequence for a lower-left correction point recognition process in a personal computer.
Figure 16:
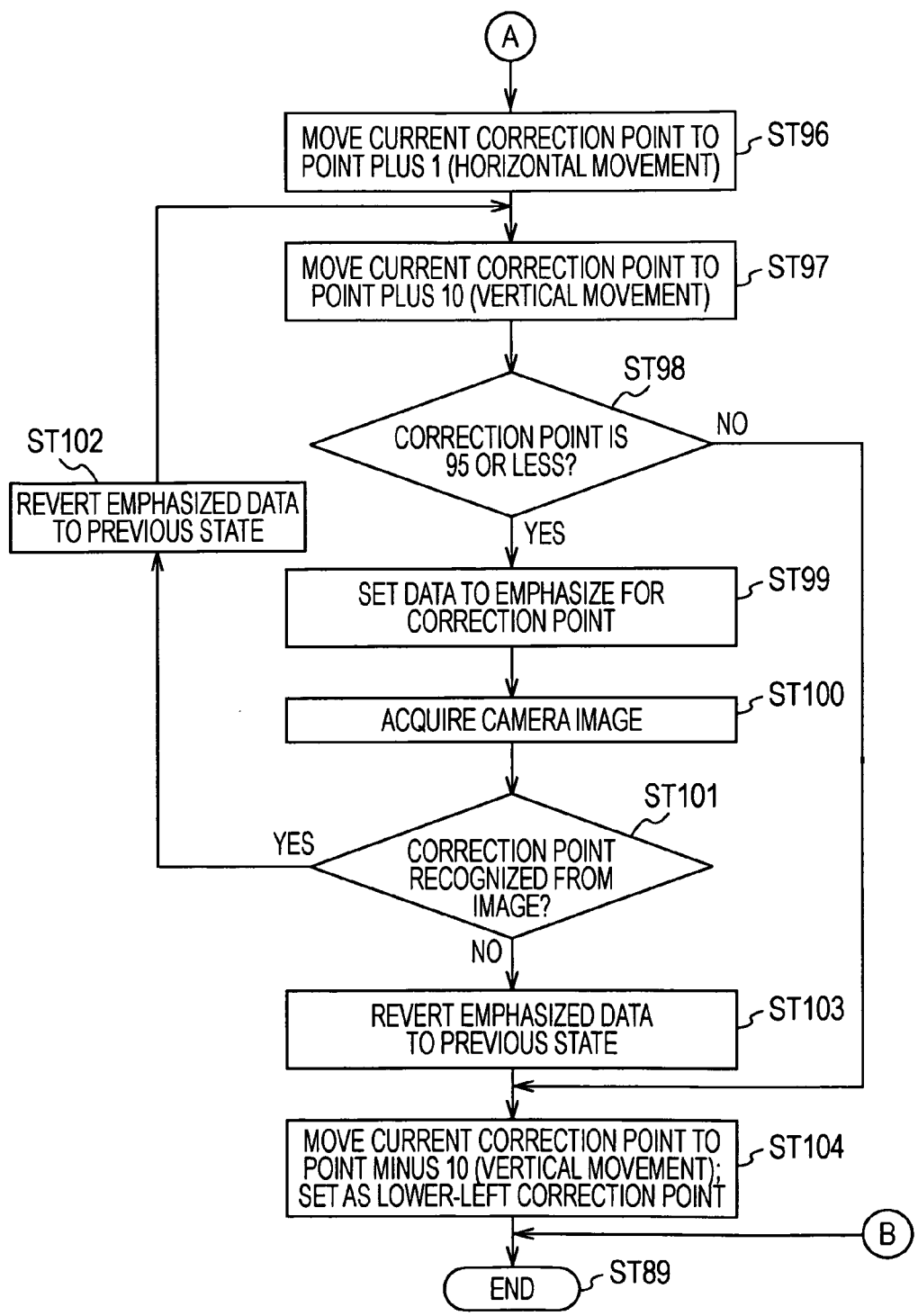
FIG. 16 is a flowchart (2/2) illustrating an exemplary processing sequence for a lower-left correction point recognition process in a personal computer.

The flowcharts in FIGS. 15 and 16 illustrate an exemplary processing sequence for lower-left correction point recognition (corresponding to step ST9 in FIG. 10) in the PC 400.

First, the PC 400 initiates the process in step ST81, and subsequently transitions to step ST82. In step ST82, the PC 400 sets the data to emphasize for the correction point 91.

Next, in step ST83, the PC 400 acquires a captured image (i.e., a captured image signal) from the camera 300. Then, in step ST84, the PC 400 determines whether or not the correction point was recognized from the captured image. If the correction point was not recognized, then the PC 400 transitions to step ST85.

In step ST85, the PC 400 reverts the emphasized data back to its previous state, and moves the current correction point to the point minus 9. In this case, the correction point moves towards the center of the picture. Then, in step ST86, the PC 400 determines whether or not the correction point is 51 or greater. When the correction point is 51 or greater, the correction point still exists in the lower-left part of the plane, and thus the PC 400 sets the data to emphasize for the correction point in step ST87, and subsequently returns to the above step ST83.

If the correction point is determined in step ST86 to not be 51 or greater, then the correction point is not in the lower-left part of the plane, and thus the PC 400 returns a detection error for position of the lower-left correction point, and subsequently terminates the process in step ST89.

If the correction point is recognized in the above step ST84, then in step ST90 the PC 400 reverts the emphasized data back to its previous state, and moves the current correction point to the point minus 1. In this case, the correction point is shifted 1 to the left in order to determine the point at the left edge. Then, in step ST91, the PC 400 divides the correction point by 10 and determines whether or not the remainder is between 1 and 5 (inclusive).

If the remainder is between 1 and 5, then the correction point still exists in the lower-left part of the plane, and thus the PC 400 sets the data to emphasize for the correction point in step ST92, and subsequently acquires the captured image (i.e., the captured image signal) from the camera 300 in step ST93. Then, in step ST94, the PC 400 determines whether or not the correction point was recognized from the captured image. If the correction point was recognized, then the PC 400 returns to step ST90, reverts the emphasized data back to its previous state, and moves the current correction point to the point minus 1.

If the correction point is not recognized in step S94, the results mean that the correction point was at the left edge before moving, and thus the PC 400 transitions to step ST95. In step ST95, the PC 400 reverts the emphasized data back to its previous state, and in step ST96, moves the current correction point to the point plus 1 (i.e., to the point at the left edge).

Next, in step ST97, the PC 400 moves the current correction point to the point plus 10. In this case, the correction point is shifted 1 downwards in order to determine the point at the bottom edge. Then, in step ST98, the PC 400 determines whether or not the correction point is 95 or less.

If the correction point is 95 or less, then the correction point still exists in the lower-left part of the plane, and thus the PC 400 sets the data to emphasize for the correction point in step ST99, and subsequently acquires the captured image (i.e., the captured image signal) from the camera 300 in step ST100. Then, in step ST101, the PC 400 determines whether or not the correction point was recognized from the captured image. If the correction point was recognized, then in step ST102 the PC 400 reverts the emphasized data back to its previous state, subsequently returns to step ST97, and moves the current correction point to the point plus 10.

If the correction point was not recognized in step ST101, the results mean that the correction point was at the bottom edge before moving, and thus in step ST103 the PC 400 reverts the emphasized data back to its previous state, and subsequently transitions to step ST104. If the correction point is not 95 or less in the above step ST98, the results mean that the correction point was at the bottom edge before moving, and thus the PC 400 immediately transitions to step ST104.

In step ST104, the PC 400 sets the point minus 10 with respect to the current correction point as the lower-left correction point. In this case, the image recognition position of the lower-left correction point becomes the position in the captured picture corresponding to the lower-left correction point. After step ST104, the PC 400 terminates the process in step ST89.

Figure 17:
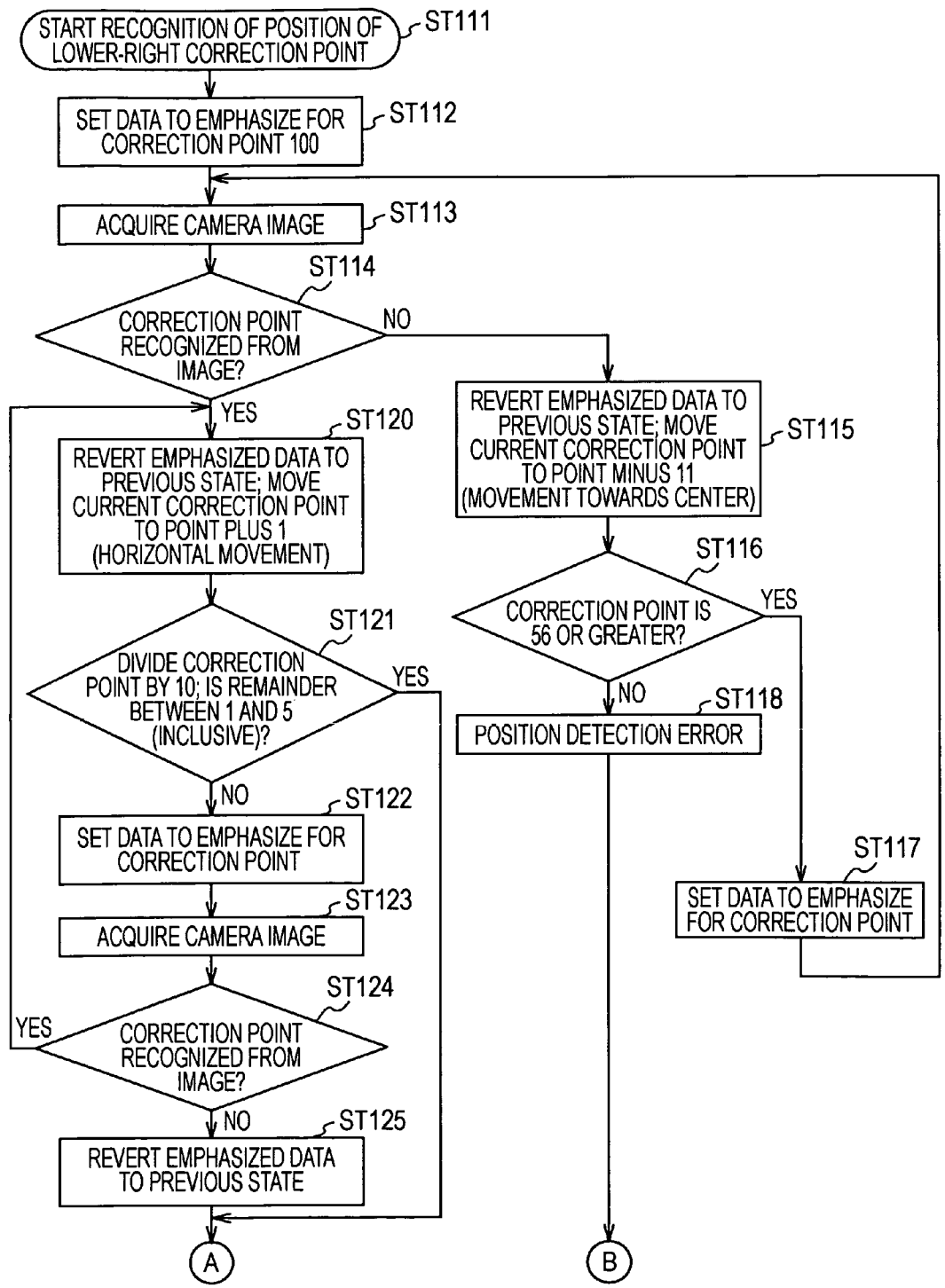
FIG. 17 is a flowchart (1/2) illustrating an exemplary processing sequence for a lower-right correction point recognition process in a personal computer.
Figure 18:
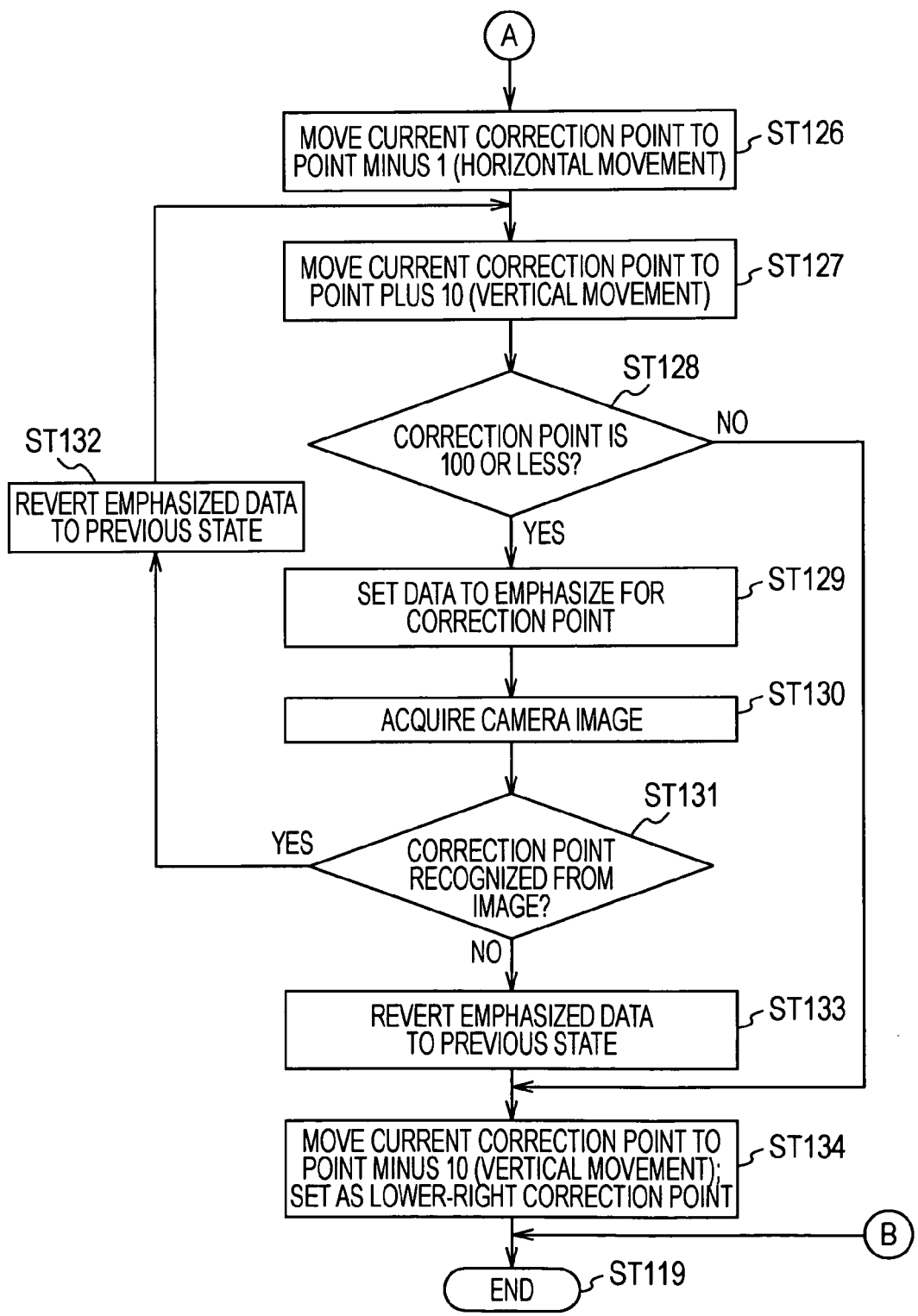
FIG. 18 is a flowchart (2/2) illustrating an exemplary processing sequence for a lower-right correction point recognition process in a personal computer.

The flowcharts in FIGS. 17 and 18 illustrate an exemplary processing sequence for lower-right correction point recognition (corresponding to step ST11 in FIG. 10) in the PC 400.

First, the PC 400 initiates the process in step ST111, and subsequently transitions to step ST112. In step ST112, the PC 400 sets the data to emphasize for the correction point 100.

Next, in step ST113, the PC 400 acquires a captured image (i.e., a captured image signal) from the camera 300. Then, in step ST114, the PC 400 determines whether or not the correction point was recognized from the captured image. If the correction point was not recognized, then the PC 400 transitions to step ST115.

In step ST115, the PC 400 reverts the emphasized data back to its previous state, and moves the current correction point to the point minus 11. In this case, the correction point moves towards the center of the picture. Then, in step ST116, the PC 400 determines whether or not the correction point is 56 or greater. When the correction point is 56 or greater, the correction point still exists in the lower-right part of the plane, and thus the PC 400 sets the data to emphasize for the correction point in step ST117, and subsequently returns to the above step ST113.

If the correction point is determined in step ST116 to not be 56 or greater, then the correction point is not in the lower-right part of the plane, and thus the PC 400 returns a detection error for position of the lower-right correction point, and subsequently terminates the process in step ST119.

If the correction point is recognized in the above step ST114, then in step ST120 the PC 400 reverts the emphasized data back to its previous state, and moves the current correction point to the point plus 1. In this case, the correction point is shifted 1 to the right in order to determine the point at the right edge. Then, in step ST121, the PC 400 divides the correction point by 10 and determines whether or not the remainder is between 1 and 5 (inclusive).

If the remainder is between 1 and 5, then the correction point still exists in the lower-right part of the plane, and thus the PC 400 sets the data to emphasize for the correction point in step ST122, and subsequently acquires the captured image (i.e., the captured image signal) from the camera 300 in step ST123. Then, in step ST124, the PC 400 determines whether or not the correction point was recognized from the captured image. If the correction point was recognized, then the PC 400 returns to step ST120, reverts the emphasized data back to its previous state, and moves the current correction point to the point plus 1.

If the correction point is not recognized in step S124, the results mean that the correction point was at the right edge before moving, and thus the PC 400 transitions to step ST125. In step ST125, the PC 400 reverts the emphasized data back to its previous state, and in step ST126, moves the current correction point to the point minus 1 (i.e., to the point at the right edge).

Next, in step ST127, the PC 400 moves the current correction point to the point plus 10. In this case, the correction point is shifted 1 downwards in order to determine the point at the bottom edge. Then, in step ST128, the PC 400 determines whether or not the correction point is 100 or less.

If the correction point is 100 or less, then the correction point still exists in the lower-right part of the plane, and thus the PC 400 sets the data to emphasize for the correction point in step ST129, and subsequently acquires the captured image (i.e., the captured image signal) from the camera 300 in step ST130. Then, in step ST131, the PC 400 determines whether or not the correction point was recognized from the captured image. If the correction point was recognized, then in step ST132 the PC 400 reverts the emphasized data back to its previous state, subsequently returns to step ST127, and moves the current correction point to the point plus 10.

If the correction point was not recognized in step ST131, the results mean that the correction point was at the bottom edge before moving, and thus in step ST133 the PC 400 reverts the emphasized data back to its previous state, and subsequently transitions to step ST134. If the correction point is not 100 or less in the above step ST128, the results mean that the correction point was at the bottom edge before moving, and thus the PC 400 immediately transitions to step ST134.

In step ST134, the PC 400 sets the point minus 10 with respect to the current correction point as the lower-right correction point. In this case, the image recognition position of the lower-right correction point becomes the position in the captured picture corresponding to the lower-right correction point. After step ST134, the PC 400 terminates the process in step ST119.

As described above, in the color correction system 100 shown in FIG. 1, the PC 400 conducts four-corner recognition to recognize positions on a captured picture corresponding to correction points at the corners of the picture portion captured by the camera 300. Using the recognition results, the image recognition block 420 then recognizes the correspondence between respective correction points on the picture from the liquid crystal projector 200 and positions in the captured picture from the camera 300.

The PC 400 conducts four-corner recognition by processing the per-color image signals captured by the camera 300. During this process, the correction data for the correction points at the corners is changed into data for emphasizing those correction points. By extracting the emphasized portions from the captured picture, the PC 400 is able to easily and accurately conduct the above recognition process. Consequently, the PC 400 is able to favorably recognize the correspondence between respective correction points on the picture from the liquid crystal projector 200 and positions in the captured picture from the camera 300. Furthermore, the PC 400 is able to accurately compute correction data at each correction point on the basis of the per-color image signals captured by the camera 300.

In addition, in the color correction system 100 shown in FIG. 1, the PC 400 conducts the following before conducting the above four-corner recognition. The PC 400 first recognizes the positions in the captured picture corresponding to first correction point located in the center of the picture from the liquid crystal projector 200, as well as a second correction point shifted away from the first correction point in both the top-down and left-right directions. In so doing, the PC 400 recognizes conditions such as top-down and left-right inversion of the captured picture. If the captured picture is top-down or left-right inverted, the PC 400 converts the captured picture to a normal display state, and subsequently conducts the above four-corner recognition. Consequently, when searching for emphasized positions as described above in order to recognize the positions in the captured picture corresponding to the corner regions, the search range can be narrowed, and processing can be simplified.

[Modification 1]

In the foregoing embodiment, the PC 400 recognizes positions in the captured pictured corresponding to the correction points at the corners of the picture portion captured by the camera 300. On the basis of the recognition results, the PC 400 recognizes the correspondence between respective correction points on the picture from the liquid crystal projector 200 and positions in the captured picture from the camera 300. In other words, on the basis of the recognition results, the PC 400 maps the R, G, and B captured images with respect to the correction points on the picture from the liquid crystal projector 200, and thereby recognizes the correspondence between respective correction points on the picture from the liquid crystal projector 200 and positions in the captured picture.

Figure 19A:
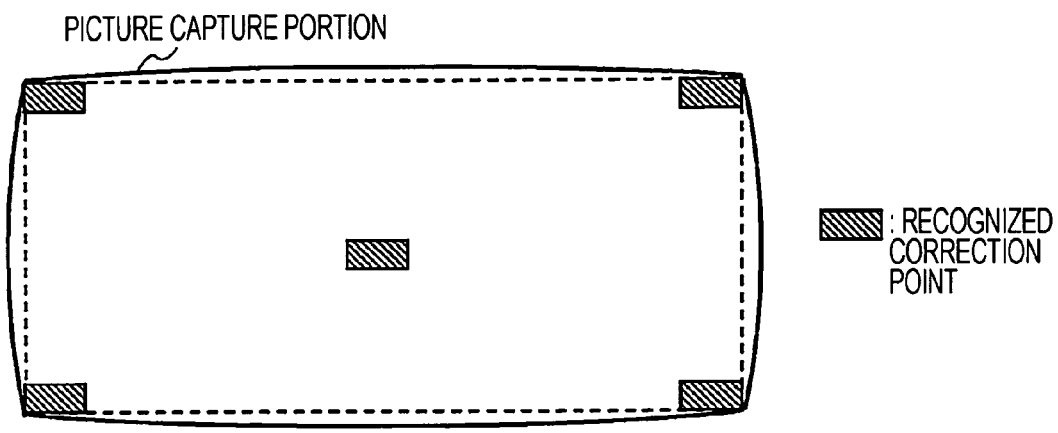
FIG. 19A illustrates the shape of the picture capture portion in a post-conversion captured picture resulting from processing R, B, and B captured images such that the shape of the picture portion from a liquid crystal projector in the captured picture matches the shape of the original rectangular picture in the liquid crystal projector.

Meanwhile, the portion of the captured picture corresponding to the rectangular picture from the liquid crystal projector 200 (i.e., the picture capture portion) might be affected by distortions of the lens or other elements of the camera 300, such that the top and bottom or left and right sides become bowed in practice. For this reason, in order to match the shape of the picture portion from the liquid crystal projector 200 in the captured picture to the shape of the original rectangular picture in the liquid crystal projector 200, the following is conducted when mapping. As shown in FIG. 19A, when converting the captured R, G, and B images, the shape of the picture capture portion of the post-conversion captured picture does not become rectangular (as indicated by the broken frame), but rather becomes bowed on the top, bottom, left, and right sides (as indicated by the solid frame).

Figure 19B:
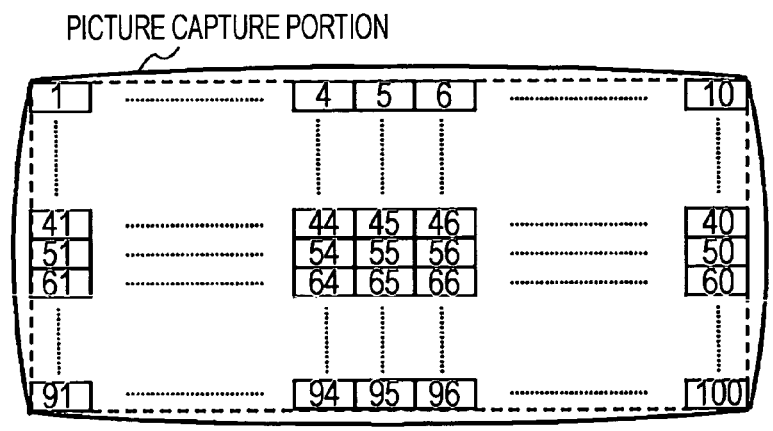
FIG. 19B illustrates the shape of the picture capture portion in a post-conversion captured picture resulting from processing R, B, and B captured images such that the shape of the picture portion from a liquid crystal projector in the captured picture matches the shape of the original rectangular picture in the liquid crystal projector.

Respective correction points (i.e., the correction points 1 to 100) are then estimated on the basis of the recognition results for the positions in the captured picture corresponding to the center and four-corner correction points. As shown in FIG. 19B, the estimated regions (labeled with point numbers) corresponding to the estimated correction points are shifted away from the regions actually corresponding to the respective correction points on the picture capture portion (i.e., the portion within the solid frame). Herein, FIG. 19B illustrates the case wherein the picture has been divided into 10 parts in both the horizontal and vertical directions, resulting in the correction points 1 to 100.

Thus, when the set value computing block 430 of the PC 400 is used to compute correction data for respective correction points as described earlier, not all of the pixel data for the estimated regions corresponding to the correction points is used. Instead, the extraction range of pixel data to be used is limited for each correction point.

Figure 19C:
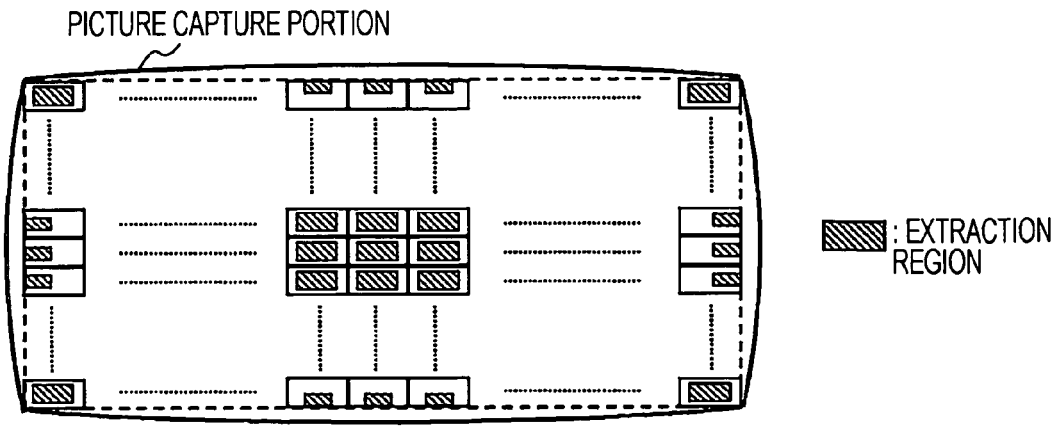
FIG. 19C illustrates the shape of the picture capture portion in a post-conversion captured picture resulting from processing R, B, and B captured images such that the shape of the picture portion from a liquid crystal projector in the captured picture matches the shape of the original rectangular picture in the liquid crystal projector.

In FIG. 19C, exemplary extraction ranges for each correction point are illustrated by hatching. In this case, extraction ranges are made larger for the recognized four-corner and center correction points, with the extraction ranges decreasing with increased distance from the recognized extraction points and biased in the outward direction.

By limiting the extraction range of pixel data to be used for each correction point in this way, the use of pixel data corresponding to adjacent correction points is suppressed when computing the correction data for each correction point, and the computational accuracy of the correction data for each correction point is increased.

[Modification 2]

Instead of limiting the extraction range for the pixel data to be used for each correction point as described above, the following method may be used to increase the accuracy of the correction data corresponding to each correction point. First, the shift amounts whereby the estimated regions corresponding to respective correction points in the picture capture portion (the solid frame) are shifted away from the regions actually corresponding to the respective correction points in the picture capture portion are computed in advance. Then, when computing the correction data in the set value computing block 430, the estimated regions corresponding to the correction points are shifted by the shift amounts before use.

In order to compute the shift amounts of the estimated regions corresponding to the correction points and estimated on the basis of the recognition results for the positions in the captured picture corresponding to the four-corner and center correction points, the following may be conducted. For example, the image recognition block 420 of the PC 400 may recognize positions in the captured picture corresponding to the correction points (from among those on the picture from the liquid crystal projector 200) at the midpoints of the quadrilateral edges of the picture portion captured by the camera 300.

Figure 6C:
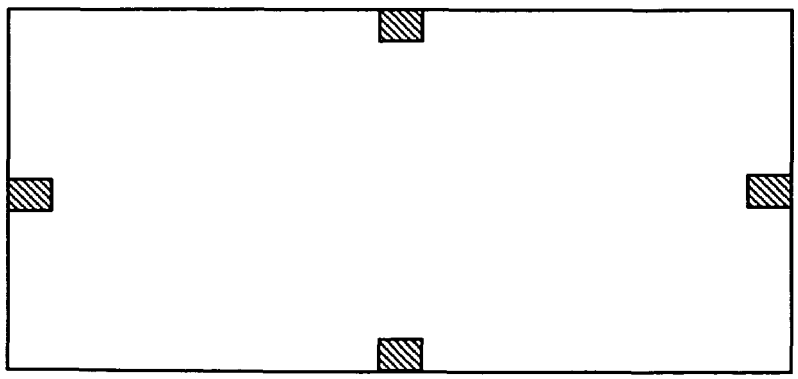
FIG. 6C illustrates an exemplary image wherein, among respective correction points on a picture from a liquid crystal projector, the correction points to be recognized as corresponding to positions on a captured picture have been emphasized.

When conducting the recognition process, the image display apparatus control block 440 changes the correction data to be set in the color correction circuits 205R, 205G, and 205B and corresponding to the correction points at the midpoints of the quadrilateral edges into data for emphasizing those correction points, similar to the case of the earlier four-corner recognition process. In this case, the regions of the above correction points on the picture from the liquid crystal projector 200 become colored so as to be clearly distinguished from nearby correction points, as shown in FIG. 6C.

Figure 20A:
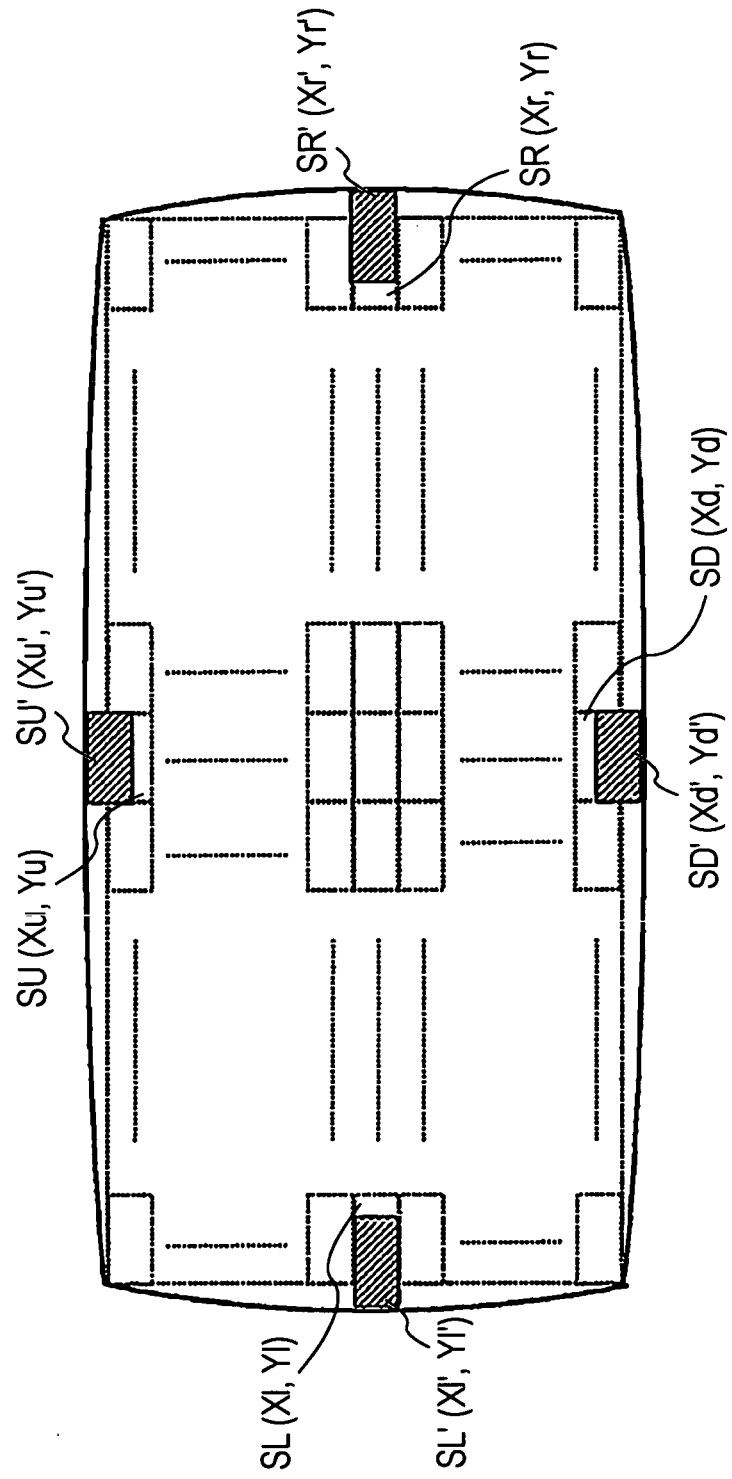
FIG. 20A is a diagram for explaining a method for computing the shifting of estimated regions from their original regions, the estimated regions corresponding to respective correction points on a post-conversion captured picture, and estimated on the basis of recognition results for positions on a captured picture corresponding to correction points at the four corners and center.

Using the results of the recognition process (i.e., the correspondence between the correction points at the midpoints of the quadrilateral edges and their corresponding positions in the captured picture), the PC 400 acquires the center pixel positions (Xu', Yu'), (Xd', Yd'), (Xr', Yr'), and (Xl', Yl') for the regions SU', SD', SR', and SL' corresponding to the correction points at the midpoints of the quadrilateral edges in the post-conversion captured picture, as shown in FIG. 20A.

In addition, the PC 400 also acquires the center pixel positions (Xu, Yu), (Xd, Yd), (Xr, Yr), and (Xl, Yl) for the estimated regions SU, SD, SR, and SL corresponding to the respective correction points on the above post-conversion captured picture. The estimated regions SU, SD, SR, and SL are estimated on the basis of the recognition results for the positions in the captured picture corresponding to the four-corner and center correction points.

The PC 400 subsequently computes the shift amounts (Xum, Yum), (Xdm, Ydm), (Xrm, Yrm), and (Xlm, Ylm) for the regions SU, SD, SR, and SL as follows:

$$(Xum, Yum)=(Xu'-Xu, Yu'-Yu)$$

$$(Xdm, Ydm)=(Xd'-Xd, Yd'-Yd)$$

$$(Xrm, Yrm)=(Xr'-Xr, Yr'-Yr)$$

$$(Xlm, Ylm)=(Xl'-Xl, Yl'-Yl)$$

In addition, using the shift amounts (Xum, Yum), (Xdm, Ydm), (Xrm, Yrm), and (Xlm, Ylm) for the regions SU, SD, SR, and SL, the PC 400 also computes shift amounts for regions corresponding to other correction points.

FIG. 20B illustrates exemplary shift amounts for estimated regions corresponding to respective correction points, in the case of correction points from 1 to 100. For the sake of simplicity, FIG. 20B only illustrates the shift amounts for the estimated regions corresponding to major correction points. In the present example, the correction point at the midpoint of the top edge is 5, the correction point at the midpoint of the bottom edge is 95, the correction point at the midpoint of the right edge is 50, and the correction point at the midpoint of the left edge is 41. In addition, the values of (Xum, Yum), (Xdm, Ydm), (Xrm, Yrm), and (Xlm, Ylm) are (3,5), (4,3), (11,−1), and (−10,1), respectively. Furthermore, the shift amount for the four-corner and center correction points (i.e., the estimated regions corresponding to the correction points 1, 10, 45, 91, and 100) is (0,0).

A way of using the shift amounts of regions corresponding to the correction points at the midpoints of the quadrilateral edges to solve for the shift amounts of regions corresponding to other correction points will now be described. Although a way of solving for the shift amounts of respective regions in the upper-left portion is described herein, the shift amounts of respective regions in the upper-right portion, the lower-left portion, and the lower-right portion can be similarly solved for.

The shift amount (Nx, Ny) with respect to a correction point N is solved for by linear interpolation according to $Leftx = Xlm/4 * Q$ $Rightx = Xum - Xum/4 * Q$ $Nx = (Rightx - Leftx)/4 * (R-1) + Leftx$ $Topy = Yum/4 * (R-1)$ $Bottomy = Ylm - Ylm/4 * (R-1)$ $Ny = (Bottomy - Topy)/4 * Q + Topy$ where Q and R are the quotient and remainder resulting from the division of N by 10, Leftx is the correction amount for the left edge x of the region, Rightx is the correction amount for the right edge x of the region, Topy is the correction amount for the top edge y of the region, and Bottomy is the correction amount for the bottom edge y of the region.

As described above, the shift amounts whereby the estimated regions corresponding to respective correction points in the picture capture portion (the solid frame) are shifted away from the regions actually corresponding to the respective correction points in the picture capture portion are computed in advance. Then, when computing the correction data in the set value computing block 430, the estimated regions corresponding to the correction points are shifted by the shift amounts. In so doing, the computational accuracy of the correction data corresponding to each correction point is increased.

Meanwhile, as described earlier, when the image recognition block 420 of the PC 400 recognizes the position in the captured picture corresponding to a given correction point, correction data for emphasizing the given correction point is set as the correction data for the given correction point. In the foregoing embodiments, the correction data for the given correction point is determined on the basis of the average of the correction data for nearby correction points.

However, when the image recognition block 420 of the PC 400 recognizes the position in the captured picture corresponding to the given correction point, the correction data for all other correction points except for the given correction point might be 0. In this case, only the correction data corresponding to the given correction point takes a specific value, and the given correction point is emphasized. For example, assume that the correction data for nearby correction points is R: 0, G: 0, and B: 0, while the correction data for the given correction point is R: −128, G: 127, and B: −128. In this case, the image recognition block 420 is easily able to find the emphasized portion from the per-color image signals.

In addition, in the foregoing embodiments, the recognition results for the positions in the captured picture corresponding to the four-corner and center correction points are used as a basis for estimating regions on the post-conversion captured picture corresponding to other correction points. However, it is also conceivable to conduct processing to recognize positions in the captured picture corresponding to other correction points and correctly acquire the regions on the post-conversion captured picture corresponding to those other correction points, similar to that of the four-corner and center correction points.

Furthermore, in the foregoing embodiments, color correction data is solved for by using the correspondence between respective correction points on a picture from a liquid crystal projector and positions on a captured picture. However, a similar correspondence can also be used to solve for brightness correction data.

Furthermore, in the foregoing embodiments, the image display apparatus is described as being a liquid crystal projector by way of example. However, it is of course possible to apply an embodiment of the present invention to the case of solving for correction data for uneven color, uneven brightness, or similar conditions in other image display apparatus, such as liquid crystal displays and plasma displays.

It should be understood by those skilled in the art that various modifications, combinations, sub-combinations and alterations may occur depending on design requirements and other factors insofar as they are within the scope of the appended claims or the equivalents thereof.

What is claimed is:

1. An image position recognition apparatus, comprising:
  an image signal acquirer configured to acquire, from an image capture apparatus, a red image signal, a blue image signal, and a green image signal obtained by capturing a picture from an image display apparatus;
  a position recognition unit configured to use the red image signal, the blue image signal, and the green image signal acquired by the image signal acquirer as a basis for recognizing a position in a captured picture corresponding to a given region among respective regions obtained by dividing the picture from the image display apparatus into a plurality of regions; and
  a correction data setting unit configured such that, when the position recognition unit recognizes the position in the captured picture corresponding to the given region of the picture from the image display apparatus, data for emphasizing the given region is set as the correction data corresponding to the given region of the red image signal, the blue image signal, and the green image signal in the image display apparatus,
  wherein the position recognition unit recognizes positions in a captured picture corresponding to regions that correspond to corners of the picture portion captured by the image capture apparatus, and
  wherein the position recognition unit recognizes the position in the captured picture corresponding to a portion that corresponds to a respective corner of the picture portion captured by the image capture apparatus, the recognition being achieved by
  conducting a first process to recognize the position in the captured picture corresponding to a first process region among those of the picture from the image display apparatus that corresponds to the respective corner, and
  if the position in the captured picture corresponding to the first process region is not recognized in the first process,
  conducting a second process to recognize the position in the captured picture corresponding to a second process region which is shifted away from the first process region and towards a center of the picture and, if the position in the captured picture corresponding to the second process region is recognized, to move the position in the captured picture corresponding to the second process region to a corner of the picture which is actually displayed.

2. The image position recognition apparatus according to claim 1, wherein before the position recognition unit recognizes the positions corresponding to the corners, the position recognition unit recognizes positions in the captured picture corresponding to a first region and a second region among the respective regions of the picture from the image display apparatus, the first region being positioned in the center of the picture portion captured by the image capture apparatus, and the second region being shifted away from the first region in both the vertical and horizontal directions.

3. The image position recognition apparatus according to claim 1, wherein the position recognition unit recognizes positions in the captured picture corresponding to the regions from among those of the picture from the image display apparatus that correspond to midpoints of quadrilateral edges of the picture portion captured by the image capture apparatus.

4. An image position recognition method, comprising the steps of:
- acquiring, from an image capture apparatus, a red image signal, a blue image signal, and a green image signal obtained by capturing a picture from an image display apparatus;
- using the red image signal, the blue image signal, and the green image signal acquired in the acquiring step as a basis for recognizing a position in a captured picture corresponding to a given region among respective regions obtained by dividing the picture from the image display apparatus into a plurality of regions; and
- setting correction data such that, when recognizing the position in the captured picture corresponding to the given region of the picture from the image display apparatus in the recognizing step, data for emphasizing the given region is set as the correction data corresponding to the given region of the red image signal, the blue image signal, and the green image signal in the image display apparatus,
- wherein the using step recognizes positions in a captured picture corresponding to regions that correspond to corners of the picture portion captured by the image capture apparatus, and
- wherein the using step recognizes the position in the captured picture corresponding to a portion that corresponds to a respective corner of the picture portion captured by the image capture apparatus, the recognition being achieved by
- conducting a first process to recognize the position in the captured picture corresponding to a first process region among those of the picture from the image display apparatus that corresponds to the respective corner, and
- if the position in the captured picture corresponding to the first process region is not recognized in the first process,
- conducting a second process to recognize the position in the captured picture corresponding to a second process region which is shifted away from the first process region and towards a center of the picture and, if the position in the captured picture corresponding to the second process region is recognized, to move the position in the captured picture corresponding to the second process region to a corner of the picture which is actually displayed.

5. A non-transitory computer-readable medium having a computer program stored thereon for causing a computer to function as:
- an image signal acquirer configured to acquire, from an image capture apparatus, a red image signal, a blue image signal, and a green image signal obtained by capturing a picture from an image display apparatus;
- a position recognition unit configured to use the red image signal, the blue image signal, and the green image signal acquired by the image signal acquirer as a basis for recognizing a position in a captured picture corresponding to a given region among respective regions obtained by dividing the picture from the image display apparatus into a plurality of regions; and
- a correction data setting unit configured such that, when the position recognition unit recognizes the position in the captured picture corresponding to the given region of the picture from the image display apparatus, data for emphasizing the given region is set as the correction data corresponding to the given region of the red image signal, the blue image signal, and the green image signal in the image display apparatus,
- wherein the position recognition unit recognizes positions in a captured picture corresponding to regions that correspond to corners of the picture portion captured by the image capture apparatus, and
- wherein the position recognition unit recognizes the position in the captured picture corresponding to a portion that corresponds to a respective corner of the picture portion captured by the image capture apparatus, the recognition being achieved by
- conducting a first process to recognize the position in the captured picture corresponding to a first process region among those of the picture from the image display apparatus that corresponds to the respective corner, and
- if the position in the captured picture corresponding to the first process region is not recognized in the first process,
- conducting a second process to recognize the position in the captured picture corresponding to a second process region which is shifted away from the first process region and towards a center of the picture and, if the position in the captured picture corresponding to the second process region is recognized, to move the position in the captured picture corresponding to the second process region to a corner of the picture which is actually displayed.

6. An apparatus for setting correction data for an image display apparatus, comprising:
- an image signal acquirer configured to acquire, from an image capture apparatus, a red image signal, a blue image signal, and a green image signal obtained by capturing a picture from an image display apparatus;
- a correction data setting unit configured to set correction data for the red image signal, the blue image signal, and the green image signal in the image display apparatus for each region obtained by dividing the picture from the image display apparatus into a plurality of regions;
- an image recognition unit configured to recognize the correspondence between the respective regions of the picture from the image display apparatus and positions in the captured picture; and
- a correction data computation unit configured such that, on the basis of the results of the correspondence recognition by the image recognition unit, the red image signal, the blue image signal, and the green image signal acquired by the image signal acquirer are used to solve for correction data corresponding to respective regions of the picture from the image display apparatus set by the correction data setting unit,
- wherein the image recognition unit recognizes positions in the captured picture corresponding to a given region among the respective regions of the picture from the image display apparatus on the basis of the red image signal, the blue image signal, and the green image signal acquired by the image signal acquirer, wherein data for emphasizing the given region has been set as correction data corresponding to the given region of the red image signal, the blue image signal, and the green image signal in the image display apparatus, wherein the image recognition unit recognizes positions in a captured picture corresponding to regions that correspond to corners of the picture portion captured by the image capture apparatus, and wherein the image recognition unit recognizes the position in the captured picture corresponding to a portion that corresponds to a respective corner of the picture portion captured by the image capture apparatus, the recognition being achieved by conducting a first process to recognize the position in the captured picture corresponding to a first process region among those of the picture from the image display apparatus that corresponds to the respective corner, and if the position in the captured picture corresponding to the first process region is not recognized in the first process, conducting a second process to recognize the position in the captured picture corresponding to a second process region which is shifted away from the first process region and towards a center of the picture and, if the position in the captured picture corresponding to the second process region is recognized, to move the position in the captured picture corresponding to the second process region to a corner of the picture which is actually displayed.

7. The apparatus for setting correction data for an image display apparatus according to claim 6, wherein the image recognition unit recognizes positions in the captured picture corresponding to regions among those of the picture from the image display apparatus that correspond to the center and the four corners of the picture portion captured by the image capture apparatus, and on the basis of the center and four-corner recognition results, recognizes the correspondence between respective regions in the picture from the image display apparatus and positions in the captured picture, when computing the correction data corresponding to respective regions of the picture from the image display apparatus, the correction data computation unit extracts and uses pixel data from the per-color image signals contained in the regions in the captured picture corresponding to the respective regions estimated according to the recognition results for the positions of the center and the four corners, and the correction data computation unit makes the extraction ranges of the pixel data from the per-color image signals corresponding to the respective regions smaller with increasing separation from the center and four-corner regions and biased in an outward direction.

8. The apparatus for setting correction data for an image display apparatus according to claim 6, wherein the image recognition unit recognizes positions in the captured picture corresponding to regions among those of the picture from the image display apparatus that correspond to the center and the four corners of the picture portion captured by the image capture apparatus, and on the basis of the center and four-corner position recognition results, recognizes the correspondence between respective regions of the picture from the image display apparatus and positions in the captured picture, the image recognition unit recognizes positions in the captured picture corresponding to regions among those of the picture from the image display apparatus that correspond to the midpoints of the quadrilateral edges of the picture portion captured by the image capture apparatus, on the basis of the recognition results for the positions of the midpoints of the quadrilateral edges by the image recognition unit, the correction data computation unit computes shift amounts for regions in the captured picture corresponding to the respective regions estimated according to the center and four-corner position recognition results, when computing correction data corresponding to the respective regions of the picture from the image display apparatus, the correction data computation unit shifts the regions in the captured picture corresponding to the respective regions estimated according to the center and four-corner position recognition results by the computed shift amounts, and uses the pixel data from the per-color image signals contained in the shifted regions.

* * * * *